（12） United States Patent
Ohzuku et al.

(10) Patent No.: US 8,349,287 B2
(45) Date of Patent: Jan. 8, 2013

(54) POSITIVE ELECTRODE ACTIVE MATERIAL AND NON-AQUEOUS ELECTROLYTE SECONDARY BATTERY CONTAINING THE SAME

(75) Inventors: Tsutomu Ohzuku, Nara (JP); Hiroshi Yoshizawa, Hirakata (JP); Masatoshi Nagayama, Hirakata (JP)

(73) Assignees: Panasonic Corporation, Osaka (JP); Osaka City University, Osaka (JP)

( * ) Notice: Subject to any disclaimer, the term of this patent is extended or adjusted under 35 U.S.C. 154(b) by 836 days.

(21) Appl. No.: 11/797,130

(22) Filed: May 1, 2007

(65) Prior Publication Data

US 2007/0207383 A1 Sep. 6, 2007

Related U.S. Application Data

(62) Division of application No. 10/277,989, filed on Oct. 23, 2002.

(30) Foreign Application Priority Data

Oct. 25, 2001 (JP) ................. 2001-328219

(51) Int. Cl.
*C01D 1/02* (2006.01)
*C01G 53/04* (2006.01)
*C01G 45/12* (2006.01)
*H01M 4/13* (2010.01)
*H01M 4/58* (2010.01)
*H01M 4/00* (2006.01)

(52) U.S. Cl. ............. 423/594.6; 423/594.15; 423/594.3; 423/599; 429/231.95; 429/223

(58) Field of Classification Search ............... 423/594.6, 423/594.15, 594.3, 599; 429/231.95, 223
See application file for complete search history.

(56) References Cited

U.S. PATENT DOCUMENTS

| 5,160,712 | A | 11/1992 | Thackeray et al. |
| 5,264,201 | A | 11/1993 | Dahn et al. |
| 5,370,948 | A | 12/1994 | Hasegawa et al. |
| 5,393,622 | A | 2/1995 | Nitta et al. |
| 5,626,635 | A | 5/1997 | Yamaura et al. |
| 5,629,110 | A | 5/1997 | Kobayashi et al. |

(Continued)

FOREIGN PATENT DOCUMENTS

EP 0 554 906 A1 8/1993

(Continued)

OTHER PUBLICATIONS

Ohauku et al., Layered Lithium Insertion Material of LiCo91/3)Ni(1/3)Mn(1/3)O92) for Lithium-Ion Batteries, 2001, Chemistry Letters (CL-010390), 2001, 642-643.*

(Continued)

*Primary Examiner* — Eugenia Wang
(74) *Attorney, Agent, or Firm* — McDermott Will & Emery LLP

(57) ABSTRACT

The present invention relates to a positive electrode active material comprising a lithium-containing composite oxide containing nickel with an oxidation state of 2.0 to 2.5 and manganese with an oxidation state of 3.5 to 4.0, the oxidation state determined by the shifts of energy at which absorption maximum is observed in the X-ray absorption near-K-edge structures, and to a non-aqueous electrolyte secondary battery using the same, the positive electrode active material being characterized in having a high capacity, a long storage life and excellent cycle life.

2 Claims, 9 Drawing Sheets

U.S. PATENT DOCUMENTS

| | | | |
|---|---|---|---|
| 5,677,087 A | 10/1997 | Amine et al. | |
| 5,738,957 A | 4/1998 | Amine et al. | |
| 5,981,106 A | 11/1999 | Amine et al. | |
| 5,985,237 A | 11/1999 | Lu et al. | |
| 6,045,771 A | 4/2000 | Matsubara et al. | |
| 6,168,887 B1 | 1/2001 | Dahn et al. | |
| 6,242,134 B1 * | 6/2001 | Fujiwara et al. | 429/223 |
| 6,291,107 B1 | 9/2001 | Shimizu et al. | |
| 6,352,794 B1 | 3/2002 | Nakanishi et al. | |
| 6,416,902 B1 | 7/2002 | Miyasaka | |
| 6,436,577 B1 | 8/2002 | Kida et al. | |
| 6,551,744 B1 | 4/2003 | Ohzuku et al. | |
| 6,582,854 B1 | 6/2003 | Qi et al. | |
| 6,660,432 B2 | 12/2003 | Paulsen et al. | |
| 6,753,111 B2 | 6/2004 | Kweon et al. | |
| 6,773,852 B2 | 8/2004 | Cho et al. | |
| 6,808,848 B2 | 10/2004 | Nakanishi et al. | |
| 6,964,828 B2 | 11/2005 | Lu et al. | |
| 7,078,128 B2 | 7/2006 | Lu et al. | |
| 2001/0024754 A1 | 9/2001 | Fukuzawa et al. | |
| 2002/0009645 A1 | 1/2002 | Shima et al. | |
| 2002/0197532 A1 | 12/2002 | Thackeray et al. | |
| 2003/0054251 A1 | 3/2003 | Ohzuku et al. | |
| 2003/0082448 A1 | 5/2003 | Cho et al. | |
| 2003/0082452 A1 | 5/2003 | Ueda et al. | |
| 2003/0087154 A1 | 5/2003 | Ohzuku et al. | |
| 2003/0129496 A1 | 7/2003 | Kasai et al. | |
| 2003/0170540 A1 | 9/2003 | Ohzuku et al. | |
| 2004/0058243 A1 | 3/2004 | Ohzuku et al. | |
| 2004/0110063 A1 | 6/2004 | Uchitomi et al. | |
| 2004/0126660 A1 | 7/2004 | Ohzuku et al. | |
| 2005/0079416 A1 | 4/2005 | Ohzuku et al. | |
| 2005/0147889 A1 | 7/2005 | Ohzuku et al. | |
| 2005/0260496 A1 | 11/2005 | Ueda et al. | |
| 2005/0271576 A1 | 12/2005 | Awana et al. | |
| 2006/0099508 A1 | 5/2006 | Thackeray et al. | |
| 2006/0204847 A1 | 9/2006 | Ohzuku et al. | |
| 2007/0009424 A1 | 1/2007 | Ohzuku et al. | |

FOREIGN PATENT DOCUMENTS

| | | |
|---|---|---|
| EP | 0 630 064 | 12/1994 |
| EP | 0 989 622 A1 | 3/2000 |
| EP | 1 026 765 | 8/2000 |
| EP | 1 073 136 | 1/2001 |
| EP | 1 309 022 A2 | 5/2003 |
| JP | 63-121258 | 5/1988 |
| JP | 3244314 | 10/1991 |
| JP | 4-267053 | 9/1992 |
| JP | 05-283076 | 10/1993 |
| JP | 06-072708 | 3/1994 |
| JP | 6-96768 | 4/1994 |
| JP | 08-171910 A | 12/1994 |
| JP | 7-37576 | 2/1995 |
| JP | 08-138670 | 5/1996 |
| JP | 08-138670 A | 5/1996 |
| JP | 8-171910 | 7/1996 |
| JP | 08-213015 A | 8/1996 |
| JP | 08-217452 | 8/1996 |
| JP | 09-055210 | 2/1997 |
| JP | 9-129229 A | 5/1997 |
| JP | 9-129230 | 5/1997 |
| JP | 10-3921 | 1/1998 |
| JP | 10-69910 | 3/1998 |
| JP | 10-199525 | 7/1998 |
| JP | 10-310433 | 11/1998 |
| JP | 10-316431 A | 12/1998 |
| JP | 11-1323 | 1/1999 |
| JP | 11-025980 | 1/1999 |
| JP | 11001323 | 1/1999 |
| JP | 11-060246 A | 3/1999 |
| JP | 11071115 | 3/1999 |
| JP | 11-167919 A | 6/1999 |
| JP | 11-310416 | 9/1999 |
| JP | 11-292547 A | 10/1999 |
| JP | 11-307094 | 11/1999 |
| JP | 11-339802 | 12/1999 |
| JP | 2000-77071 | 3/2000 |
| JP | 2000-082466 | 3/2000 |
| JP | 2000-133262 | 5/2000 |
| JP | 2000-149923 | 5/2000 |
| JP | 2000149942 | 5/2000 |
| JP | 2000-182618 A | 6/2000 |
| JP | 2000-195514 A | 7/2000 |
| JP | 2000223122 | 8/2000 |
| JP | 2000-251892 | 9/2000 |
| JP | 2000-268874 A | 9/2000 |
| JP | 2000-323123 A | 11/2000 |
| JP | 2001-23640 A | 1/2001 |
| JP | 2001-035495 A | 2/2001 |
| JP | 2001-085006 | 3/2001 |
| JP | 2001-185145 A | 7/2001 |
| JP | 2001-192210 | 7/2001 |
| JP | 2001-202959 | 7/2001 |
| JP | 2001185153 A * | 7/2001 |
| JP | 2001-243952 | 9/2001 |
| JP | 2001-332261 | 11/2001 |
| JP | 2002-42813 | 2/2002 |
| JP | 2002-145623 | 5/2002 |
| JP | 2002-158011 | 5/2002 |
| JP | 2002304993 | 10/2002 |
| JP | 2002-338250 | 11/2002 |
| JP | 2003-059490 | 2/2003 |
| JP | 2003-137555 | 5/2003 |
| JP | 2003-203633 | 7/2003 |
| JP | 2003-221236 | 8/2003 |
| JP | 2003-238165 | 8/2003 |
| JP | 2004-002141 | 1/2004 |
| KR | 2002-0019221 | 3/2002 |
| KR | 2000-0017619 | 3/2003 |
| WO | WO 98/20571 * | 5/1998 |
| WO | WO 98/57386 A1 | 12/1998 |
| WO | WO 01/99215 A1 | 12/2001 |
| WO | WO 02/40404 A1 | 5/2002 |
| WO | WO 03/015198 A2 | 2/2003 |

OTHER PUBLICATIONS

M.M. Grush et al., "Correlating Electronic Structure with Cycling Performance of Substituted $LiMn_2O_4$ Electrode Materials: A Study Using the Techniques of Soft X-ray Absorption and Emission", Chem. Mater, 2000, 12, pp. 659-664.

Qiming Zhong et al., "Synthesis and Electrochemistry of $LiNi_xMn_{2-x}O_4$", J. Electrochem. Soc., vol. 144, No. 1, Jan. 1997, pp. 205-213.

E. Rossen et al., "Structure and electrochemistry of $Li_xMn_yNi_{1-y}O_2$", Solid State Ionics 57, (1992), pp. 311-318.

B.J. Neudecker et al., "Lithium Manganese Nickel Oxides $Li_x(Mn_yNi_{1-y})_{2-x}O_2$, I. Synthesis and Characterization of Thin Films and Bulk Phases", J. Electrochem. Soc., vol. 145, No. 12, Dec. 1998, pp. 4148-4159.

"Layered Cathode Materials $Li[Ni_xLi_{(1/3-2x/3)}Mn_{(2/3-x/3)}]O_2$ for Lithium-Ion Batteries." Zhonghua Lu, et al. Electrochemical and Solid-State Letters 4(11) (2001), pp. A191-A194.

"Relationship Between Chemical Bonding Character and Electrochemical Performance in Nickel-Substituted Lithium Manganese Oxides." Hyo-Suk Park, et al. J. Phys. Chem. B vol. 105 No. 21 (2001), pp. 4860-4866.

"Synthesis, Structure, and Electrochemical Behavior of $Li[Ni_x Li_{1/3-2x/3} Mn_{2/3-x/3}]O_2$" Zhonghua Lu, et al. Journal of the Electrochemical Society 149(6) (2002) pp. A778-A791.

"Preparation by a 'chimie douce' route and characterization of $LiNi_zMn_{1-z}O2$ ($0.5 \leq z \leq 1$) Cathode Materials." Daniel Caurant, et al. J. Mater. Chem. 6(7) (1996), pp. 1149-1155.

Ohzuku et al., Chemistry Letters, vol. 30 (2001), No. 7, pp. 642-643.
Ohzuku et al., Chemistry Letters, vol. 30 (2001), No. 8, pp. 744-745.
Ohzuku, T. et al., "Electrochemistry amd Structural Chemistry of $LiNiO_2$ (R3m) for 4 Volt Secondary Lithium Cells" J. Electrochem. Soc., Jul. 1993, vol. 140, No. 7 pp. 1862-1870.

Spahr, M. et al. "Characterization of Layered Lithium Nickel Manganese Oxides Synthesized by a Novel Oxidative Coprecipitation Method and Their Electrochemical Performance as Lithium Insertion Electrode Materials" J. Electrochem. Soc., Apr. 1998, vol. 145, No. 4, pp. 1113-1120.

Atsushi Ueda et al., "Solid-State Redox Reactions of LiNi$_{1/2}$Co$_{1/2}$O$_2$ (R3m) for 4 Volt Secondary Lithium Cells", J. Electrochem. Soc., vol. 141, No. 8, Aug. 1994, pp. 2010-2014.

Tabuchi M et al., "Electrochemical and magnetic properties of lithium manganese oxide spinels prepared by oxidation of low temperature of hydrothermally obtained LiMnO2", vol. 89, No. 1-2, Aug. 1, 1996, pp. 53-63, XP004070124.

Search Report dated May 30, 2008.

Cho, T. et al., "Preparation of Layered Li[Ni$_{1/3}$Mn$_{1/3}$Co$_{1/3}$]O$_2$ as a Cathode for Lithium Secondary Battery by Carbonate Coprecipitation Method," Chemistry Letters, Feb. 24, 2004, p. 704-705, vol. 33, No. 6, The Chemical Society of Japan, Japan.

Ohzuku, T. et al., "Comparative Study of LiCoO$_2$, LiNi$_{1/2}$Co$_{1/2}$O$_2$ And LiNiO$_2$ For 4 Volt Secondary Lithium Cells," The Journal of The Internation Society of Electrochemistry, Jun. 1993, p. 1159-1167, vol. 38 No. 9, Pergamon Press.

Ohzuku, T. et al., "Solid State Electrochemistry of Intercalation Compound of LiAl$_{1/2}$Ni$_{1/2}$O$_2$(R3m) for Lithium-Ion Batteries," Electrochemisty of Intercalation, (1998), p. 1209-1214, vol. No. 12, The Electrochemical Society of Japan, Japan.

Ohzuku, T. et al., "Why transition metal (di) oxides are the most attractive materials for batteries," Solid State Ionics, Aug. 1994, p. 202-211, vol. 69 No. 3,4, North-Holland, The Netherlands.

Ohzuku, T. et al., "Synthesis and Characterization of LiAl$_{1/4}$Ni$_{3/4}$O$_2$ (R3m) for Lithium-Ion (Shuttlecock) Batteries," Journal of the Elctrochemical Society, Dec. 1995, p. 4033-4039, vol. 142 No. 12, The Electrochemical Society, Inc.

Ohzuku, T. et al., "Synthesis and Characterization of LiNiO$_2$ (R3m) for Rechargeable Nonaqueous Cells," Chemistry Express, vol. 6, No. 3, Mar. 1991, pp. 161-164, Kinki Chemical Society, Japan.

Ohzuku, T. et al., "New Route to Prepare LiNiO$_2$ for 4-Volts Secondary Lithium Cells," Chemistry Express, vol. 7, No. 9, pp. 689-692, 1992, Kinki Chemical Society, Japan.

Neudecker, B.J. et al., "Lithium Manganese Nickel Oxides Li$_x$(Mn$_y$Ni$_{1-y}$)$_{2-x}$O$_2$," J. Electrochem. Soc., Dec. 1998, p. 4148-1459, vol. 145, No. 12, The Electrochemical Society, Inc.

Yoshio, M. et al., "Preparation and properties of LiCo$_y$Mn$_x$Ni$_{1-x-y}$O$_2$ as a chathode for lithium ion batteries," Journal of Power Sources, Aug. 17, 1998, p. 176-181, vol. 90, Elsevier.

Lu, Z. et al., Layered Cathode Materials Li[Ni$_x$Li$_{(1/3-2x/3)}$Mn$_{(2/3-x/3)}$]O$_2$ for Lithium-Ion Batteries, Electrochemical and Solids-Sate Letters, 2001, p. A191-A194, vol. 4, The Electrochemical Society, Inc.

Lu, Z. et al., "Layered Li[Ni$_x$Co$_{1-2x}$Mn$_x$]O$_2$ Cathode Materials for Lithium-Ion Batteries," Electrochemical and Solid-State Letters, Jun. 4, 2001, p. A200-A203, vol. 12, The Electrochemical Society, Inc.

Terada, Y. et al., "In Situ XAFS Analysis of Li(Mn, M)$_2$ O$_4$(M=Cr, Co, Ni) 5V Cathode Materials for Lithium-Ion Secondary Batteries," Journal of Solid Sate Chemistry, Feb. 2001, p. 286-291, vol. 156 Issue 2, Academic Press.

Park, H. et al., "Relationship between Chemical Bonding Character and Electrochemical Performance in Nickel-Substituted Lithium Manganese Oxides," J. Phys. Chem., May 3, 2001, p. 4860-4868, vol. 105, American Chemical Society.

Lu et al., "Superlattice Ordering of Mn, Ni, and Co in Layered Alkali Transition Metal Oxides with P2, P3, and O3 Structures," Chem. Mater, p. 3583-3590, vol. 12, American Chemical Society.

Abraham, et al., "Surface changes on LiNi0.8Co0.2O2 particles during testing of high power lithium-ion cells," Electrochemistry Communications, May 2002, p. 620-625, vol. 4, Elsevier.

West et al., "Introduction for Solid-State Chemistry," Kodansha-Scientific, Mar. 20, 1996, with partial translation.

Yoshio et al., "Lithium-ion Secondary Battery," Nikkan Kogyo Shinbunsha, Mar. 29, 1996, with partial translation.

Saka, K, "Study of Crystal Electron microscope," Uchida Rokakuho, Nov. 25, 1997, with partial translation.

Japanese Society of Microscopy, Kanto Division, "Technique of Electron microscope technique for advanced material evaluation," Asakura-shoten, Dec. 15, 1991, with partial translation.

Kato, M., "Analysis of X-ray diffraction," Uchida Rokakuho, Apr. 20, 1990, with partial translation.

Zhonghua, L. et al., "Superlattice Ordering of Mn, Ni, and Co in Layered Alkali Transition Metal Oxides with P2, P3, and O3 Structures", Chem Mater, 2000, pp. 3583-3590, American Chemical Society, U.S.

Kanno, R. et al., "Structure and Physical Properties in Cathode Materials for Lithium Secondary cells—Lithium Nickel Oxides and Lithium Manganese Oxides" Department of Chemistry, Faculty of Science, Kobe University, announced on Dec. 7, 1998, pp. 85-95.

Arai, H. et al., "Electrochemical and Thermal Behavior of LiNi$_{1-z}$M$_z$O$_2$ (M = Co, Mn, Ti)" J. Electrochem. Soc., Sep. 1997, vol. 144, No. 9, pp. 3117-3125.

United States Office Action issued in U.S. Appl. No. 10/629,815 dated on Jul. 10, 2008.

Japanese Office Action issued in Japanese Patent Application No. JP 2001-195353 dated on Aug. 28, 2008.

European Search Report issued in European Patent Application No. EP 4256668.7-1227 dated on Aug. 6, 2008.

United States Office Action issued in U.S. Appl. No. 10/277,989, mailed Feb. 25, 2009.

United States Office Action issued in U.S. Appl. No. 10/277,989 dated on Jun. 27, 2008.

United States Office Action issued in U.S. Appl. No. 10/629,815, mailed Jul. 23, 2009.

United States Office Action issued in U.S. Appl. No. 10/362,944, mailed Jul. 23, 2009.

United States Office Action issued in U.S. Appl. No. 10/277,989 dated Apr. 21, 2011.

* cited by examiner

F I G. 3
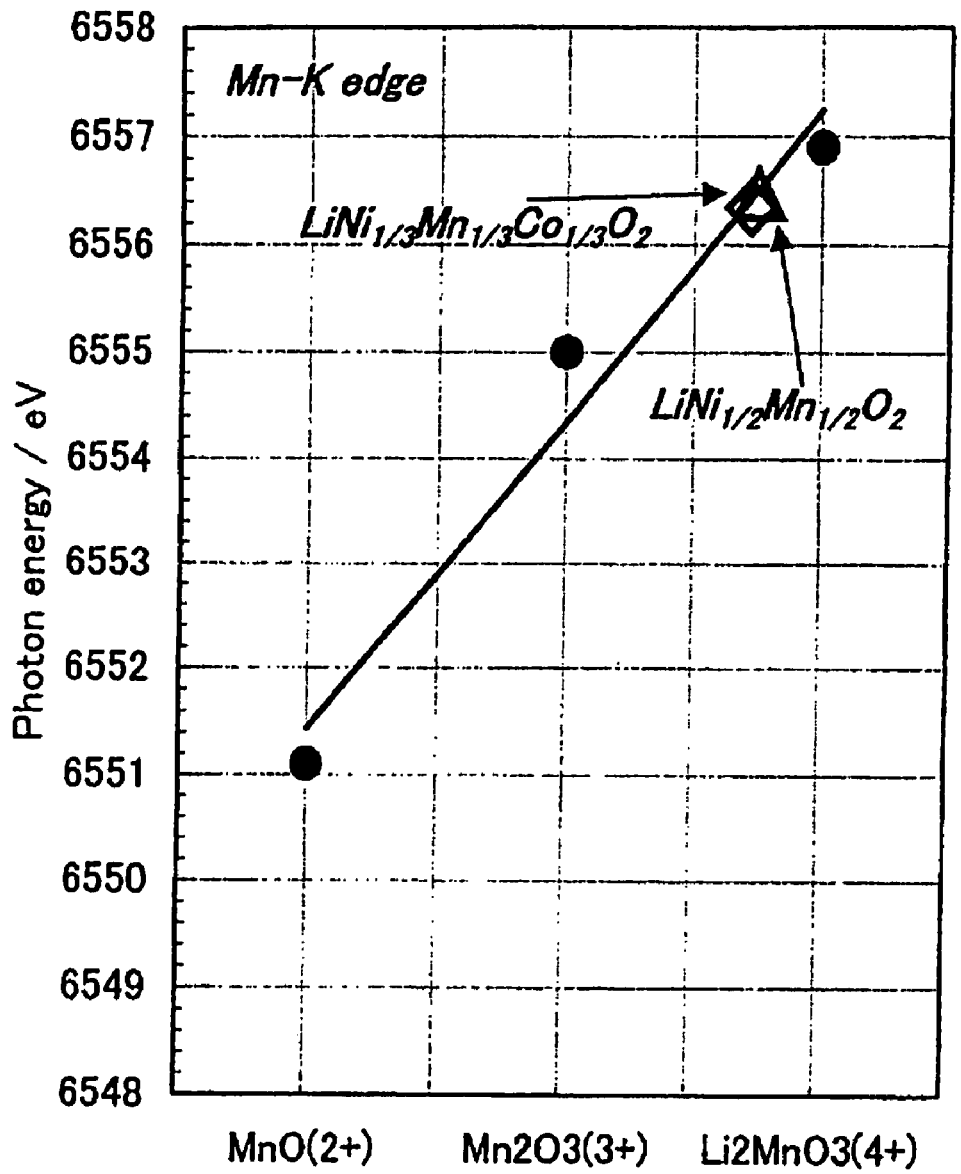

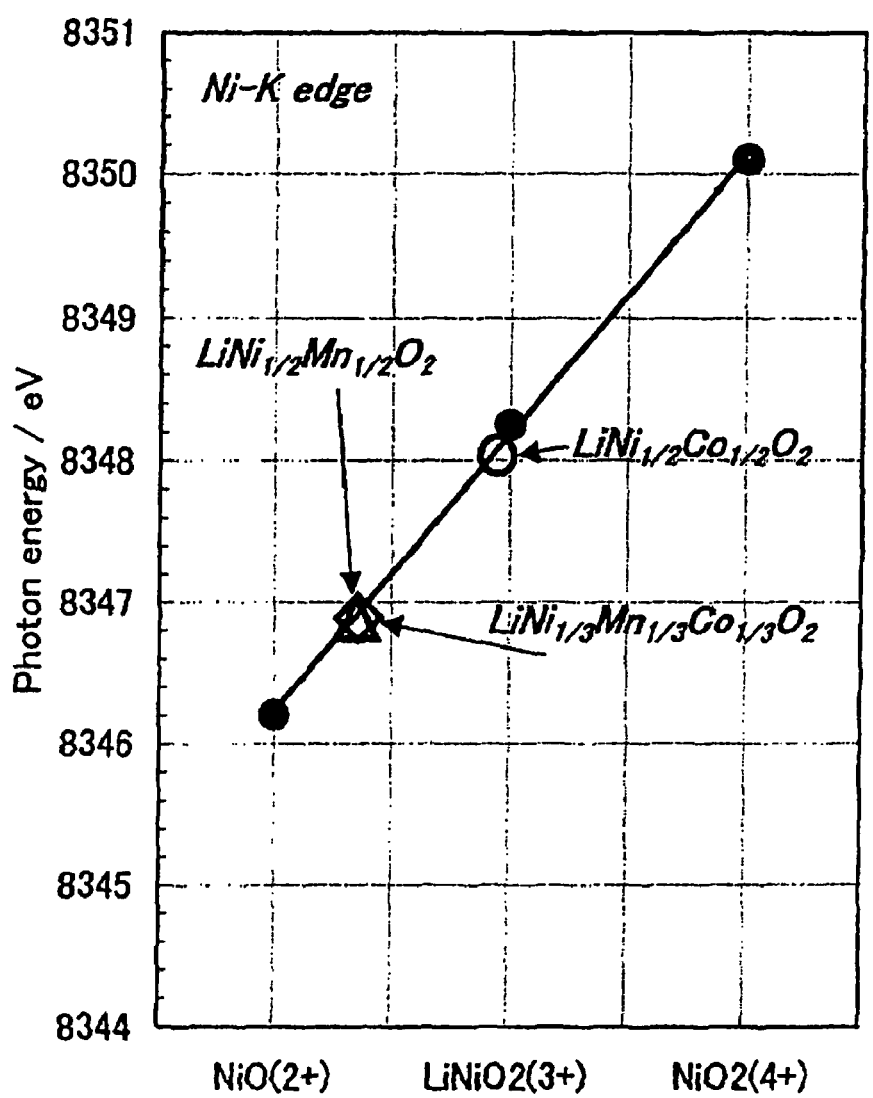
F I G. 4

FIG. 6
(a)
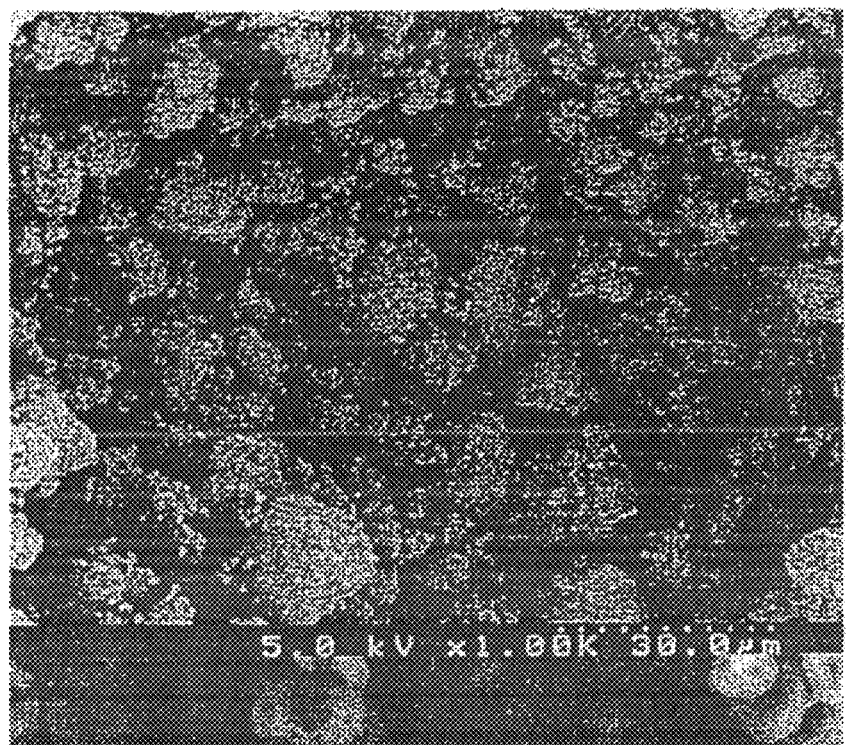
×1K
(b)
×30K

POSITIVE ELECTRODE ACTIVE MATERIAL AND NON-AQUEOUS ELECTROLYTE SECONDARY BATTERY CONTAINING THE SAME

RELATED APPLICATIONS

This application is a divisional of application Ser. No. 10/277,989, filed on Oct. 23, 2002, which in turn claims the benefit of Japanese Application No. 2001-328219, filed on Oct. 25, 2001, the disclosures of which Applications are incorporated by reference herein.

BACKGROUND OF THE INVENTION

The present invention relates to a positive electrode active material, particularly to a positive electrode active material for a non-aqueous electrolyte battery. The present invention further relates to a high-capacity and low-cost non-aqueous electrolyte secondary battery having a positive electrode containing a specific positive electrode active material.

In recent years, with the widespread use of cordless and portable AV appliances, personal computers and the like, the need has been increasing for compact, light weight, and high energy density batteries as power sources for driving those appliances. In particular, lithium secondary batteries, as having high energy density, are expected to be dominant batteries in the next generation, and the potential market thereof is very large.

In most of the lithium secondary batteries currently available on the market, $LiCoO_2$ having a high voltage of 4 V is used as the positive electrode active material, but $LiCoO_2$ is costly because Co is expensive. Under such circumstances, research has been progressing to investigate various positive electrode active materials as substitutes for $LiCoO_2$. Among them, a lithium-containing transition metal oxide has been wholeheartedly researched: $LiNi_aCo_bO_2$ (a+b≈1) is promising, and it seems that $LiMn_2O_4$ having a spinel structure has already been commercialized.

In addition, nickel and manganese as substitute materials for expensive cobalt have also been under vigorous research. $LiNiO_2$ having a layered structure, for example, is expected to have a large discharge capacity, but the crystal structure of $LiNiO_2$ changes during charging/discharging, causing a great deal of deterioration thereof. In view of this, it is proposed to add to $LiNiO_2$ an element that can stabilize the crystal structure during charging/discharging and thus prevent the deterioration. As the additional element, specifically, there are exemplified cobalt, manganese, titanium and aluminum.

Moreover, prior art examples which use composite oxides of Ni and Mn as the positive electrode active material for lithium secondary batteries will be described: U.S. Pat. No. 5,393,622, for example, proposes a method in which a hydroxide of Ni, a hydroxide of Mn and a hydroxide of Li are dry-mixed together and baked and, after cooling them down to room temperature, the mixture is again heated and baked to obtain an active material having a composition represented by the formula $Li_yNi_{1-x}Mn_xO_2$ wherein $0 \leq x \leq 0.3$, $0 \leq y \leq 1.3$.

Further, U.S. Pat. No. 5,370,948 proposes a method in which a Li salt, a Ni salt and a Mn salt are mixed together into an aqueous solution, followed by drying and baking, to obtain an active material represented by the formula $LiNi_{1-x}Mn_xO_2$ wherein $0.005 \leq x \leq 0.45$.

Further, U.S. Pat. No. 5,264,201 proposes a dry synthesis method in which hydroxides or oxides of nickel and manganese and an excess amount of lithium hydroxide are mixed together and baked, and a synthesis method in which an oxides of nickel and manganese or the like are added to a saturated aqueous solution of lithium hydroxide to form a slurry, which is then dried and baked under a reduced pressure, to obtain an active material represented by the formula $Li_xNi_{2-x-y}Mn_yO_2$ wherein $0.8 \leq x \leq 1.0$, $y \leq 0.2$.

Furthermore, U.S. Pat. No. 5,629,110 proposes a dry mixing synthesis method which uses β-$Ni(OH)_2$ to obtain an active material represented by the formula $LiNi_{1-x}Mn_xO_2$ wherein $0<x \leq 0.2$, $y \leq 0.2$.

Japanese Laid-Open Patent Publication No. Hei 8-171910 proposes a method in which manganese and nickel are coprecipitated by adding an alkaline solution into an aqueous solution mixture of manganese and nickel, then lithium hydroxide is added and the resulting mixture is baked, to obtain an active material represented by the formula $LiNi_xMn_{1-x}O_2$ wherein $0.7 \leq x \leq 0.95$.

Further, Japanese Laid-Open Patent Publication No. Hei 9-129230 discloses a preferable particulate active material having a composition represented by the formula $LiNi_xM_{1-x}O_2$ wherein M is at least one of Co, Mn, Cr, Fe, V and Al, $1>x \geq 0.5$, and shows a material with x=0.15 as the active material containing Ni and Mn.

Further, Japanese Laid-Open Patent Publication No. Hei 10-69910 proposes an active material synthesized by a coprecipitation synthesis method, represented by the formula $Li_{y-x1}Ni_{1-x2}M_xO_2$ wherein M is Co, Al, Mg, Fe, Mg or Mn, $0<x_2 \leq 0.5$, $0 \leq x_1 < 0.2$, $x=x_1+x_2$, and $0.9 \leq y \leq 1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

It should be noted that, although U.S. Pat. No. 5,985,237 shows a production method of $LiMnO_2$ having a layered structure, this is practically a 3 V level active material.

All of the prior art examples disclosed in the above U.S. patents and Japanese Laid-Open Patent Publications are intended to improve the electrochemical characteristics such as the cycle characteristic of $LiNiO_2$ by adding a trace amount of an element to $LiNiO_2$, while retaining the characteristic properties of $LiNiO_2$. Accordingly, in the active material obtained after the addition, the amount of Ni is always larger than that of Mn, and the preferable proportion is considered to be Ni:Mn=0.8:0.2. As an example of a material having a proportion with a highest amount of Mn, Ni:Mn=0.55:0.45 is disclosed.

However, in any of these prior art examples, it is difficult to obtain a composite oxide having a single-phase crystal structure since $LiNiO_2$ is separated from $LiMnO_2$. This is because nickel and manganese are oxidized in different areas during coprecipitation, and a homogenous oxide is not likely to be formed.

As described above, as a substitute material for the currently commercialized $LiCoO_2$ having a high voltage of 4 V, $LiNiO_2$ and $LiMnO_2$ as high-capacity and low-cost positive electrode active materials having a layered structure like $LiCoO_2$ have been researched and developed.

However, the discharge curve of $LiNiO_2$ is not flat, and the cycle life is short. In addition, the heat resistance is low, and hence the use of this material as the substitute material for $LiCoO_2$ would involve a serious problem. In view of this, improvements have been attempted by adding various elements to $LiNiO_2$, but satisfactory results have not been obtained yet. Further, since a voltage of only 3 V can be obtained with $LiMnO_2$, $LiMn_2O_4$ which does not have a layered structure but has a spinel structure with low-capacity is beginning to be researched.

Namely, required has been a positive electrode active material which has a voltage of 4V, as high as $LiCoO_2$, exhibits a flat discharge curve, and whose capacity is higher and cost is lower than $LiCoO_2$; further required has been a high-capacity non-aqueous electrolyte secondary battery with excellent charge/discharge efficiency, which uses the above positive electrode active material.

As opposed to this, Japanese Patent Application No. 2000-227858 does not propose a technique for improving the inherent characteristics of $LiNiO_2$ or those of $LiMnO_2$ by adding a new element thereto, but proposes a positive electrode active material composed of a nickel manganese composite oxide which represents a new function by dispersing a nickel compound and a manganese compound uniformly at the atomic level to form a solid solution.

That is to say, the prior art examples propose plenty of additional elements, but not technically clarify which elements are specifically preferred, whereas the above application proposes the positive electrode active material which can represent a new function by combining nickel and manganese at about the same ratio.

As described above, the composition and synthesis method for composite oxides are conventionally known. On the other hand, in spite of the fact that the oxidation state of transition metals such as nickel, manganese and cobalt in the composite oxides influences the finishing of the material, it is not described in patent publications and laid-open patent publications although it is discussed in related papers.

For instance, M. M. Grush et al. report, in Chem. Mater., 12(3), 659-664, 2000, that Me in $LiMn_{2-y}Me_yO_4$ having a spinel structure is trivalent if Me is cobalt and is bivalent if Me is nickel.

Likewise, Qiming Zhong and J. R. Dahn et al. report, in J. Electrochem. Soc., 144(1), 205-213, 1997, that the oxidation state of $LiNi_xMn_{2-x}O_4$ having a spinel structure can be represented by $Li^{+1}Ni_x^{+2}Mn_{1-2x}^{+3}Mn_{1-x}^{+4}O_4^{-2}$. They further report that, in the charge/discharge behavior of this material, the flat part at 4.1 V corresponds to the oxidation-reduction of $Mn^{3+}$ and $Mn^{4+}$, the flat part at 4.7 V corresponds to the oxidation-reduction of $Ni^{2+}$ and $Ni^{4+}$.

All of these composite oxides have a spinel structure and, in particular, the composite oxides containing Mn and Ni have a high potential of 4.7 V in the charge/discharge range.

Regarding oxides having a layered structure such as $LiCoO_2$ and $LiNiO_2$, E. Rossen and J. R. Dahn et al. report, in Solid State Ionics, 57(3-4), 311-18, 1992, that $Mn^{4+}$ exists in $Li_xMn_yNi_{1-y}O_2$ and that the capacity decreases as the amount of $Mn^{4+}$ is increased.

Furthermore, B. J. Neudecker, J. B. Bates et al. report, in J. Electrochem. Soc., 145(12), 1998, that the XPS measurement revealed the existences of $Mn^{3+}$ and $Mn^{4+}$, and $Ni^{2+}$ in $Li_x(Mn_yNi_{1-y})_{2-x}O_2$. However, they note that $Ni^{2+}$ exists on the surface of the particle while $Ni^{3+}$ exists inside the particle.

In view of the above, the present inventors have developed a positive electrode active material composed of a lithium-containing composite oxide having a high capacity, a long storage life and excellent cycle life by controlling the oxidation state of each element, in addition to controlling the composition of lithium-containing composite oxide obtained by the incorporation of nickel and manganese in solid solution according to conventional techniques.

That is to say, the present invention is intended to provide a positive electrode active material composed of a lithium-containing composite oxide containing elements with a controlled oxidation state.

BRIEF SUMMARY OF THE INVENTION

The present invention relates to a positive electrode active material comprising a lithium-containing composite oxide containing nickel with an oxidation state of 2.0 to 2.5 and manganese with an oxidation state of 3.5 to 4.0, the oxidation state determined by the shifts of energy at which absorption maximum is observed in the X-ray absorption near-K-edge structures.

In the aforesaid positive electrode active material, the values of nickel and manganese determined by the shifts of energy at which absorption maximum is observed in the X-ray absorption near-K-edge structures are preferably bivalent and tetravalent respectively, before charging and when the voltage relative to lithium metal is 2.5 to 3.5 V.

Also, the positive electrode active material preferably has a working potential relative to lithium metal of 3.3 to 4.6 V and a charge/discharge capacity of not less than 150 mAh per gram.

Further, the lithium-containing composite oxide preferably has a layered structure with lattice constants attributed to hexagonal crystal system of a=2.80 to 2.95 and c=13.8 to 14.4.

Furthermore, the lithium-containing composite oxide preferably contains nickel and manganese substantially at the same ratio.

The lithium-containing composite oxide is preferably represented by the formula (1): $Li[M_x(Ni_\delta Mn_\gamma)_{1-x}]O_2$, where M is one or more of elements except for nickel and manganese, $-0.1 \leq x \leq 0.3$, $\delta=0.5\pm0.1$, $\gamma=0.5\pm0.1$, and $-0.1 \leq x \leq 0.5$ in the case of M being cobalt.

The oxidation state of the M is preferably trivalent and the M preferably contains at least one of aluminum and cobalt.

Moreover, the positive electrode active material preferably comprises a mixture of crystal particles of the lithium-containing composite oxide having a particle size of 0.1 to 2 μm and secondary particles of the crystal particles having a particle size of 2 to 20 μm.

The present invention further provides a non-aqueous electrolyte secondary battery comprising: a negative electrode containing, as a negative electrode active material, a material capable of absorbing and desorbing lithium ions and/or metal lithium; a positive electrode containing the aforesaid positive electrode active material; and an electrolyte.

According to the present invention, a high-capacity non-aqueous electrolyte secondary battery with excellent charge/discharge efficiency can be fabricated.

While the novel features of the invention are set forth particularly in the appended claims, the invention, both as to organization and content, will be better understood and appreciated, along with other objects and features thereof, from the following detailed description taken in conjunction with the drawings.

BRIEF DESCRIPTION OF THE SEVERAL VIEWS OF THE DRAWING

FIG. 3 is a graph obtained from the results of XANES measurement of the positive electrode active materials of the present invention which is used to estimate Mn valence.

FIG. 4 is a graph obtained from the results of XANES measurement of the positive electrode active materials of the present invention which is used to estimate Ni valence.

FIG. 6 is a SEM image of the positive electrode active material of the present invention.

DETAILED DESCRIPTION OF THE INVENTION

Figure 1:
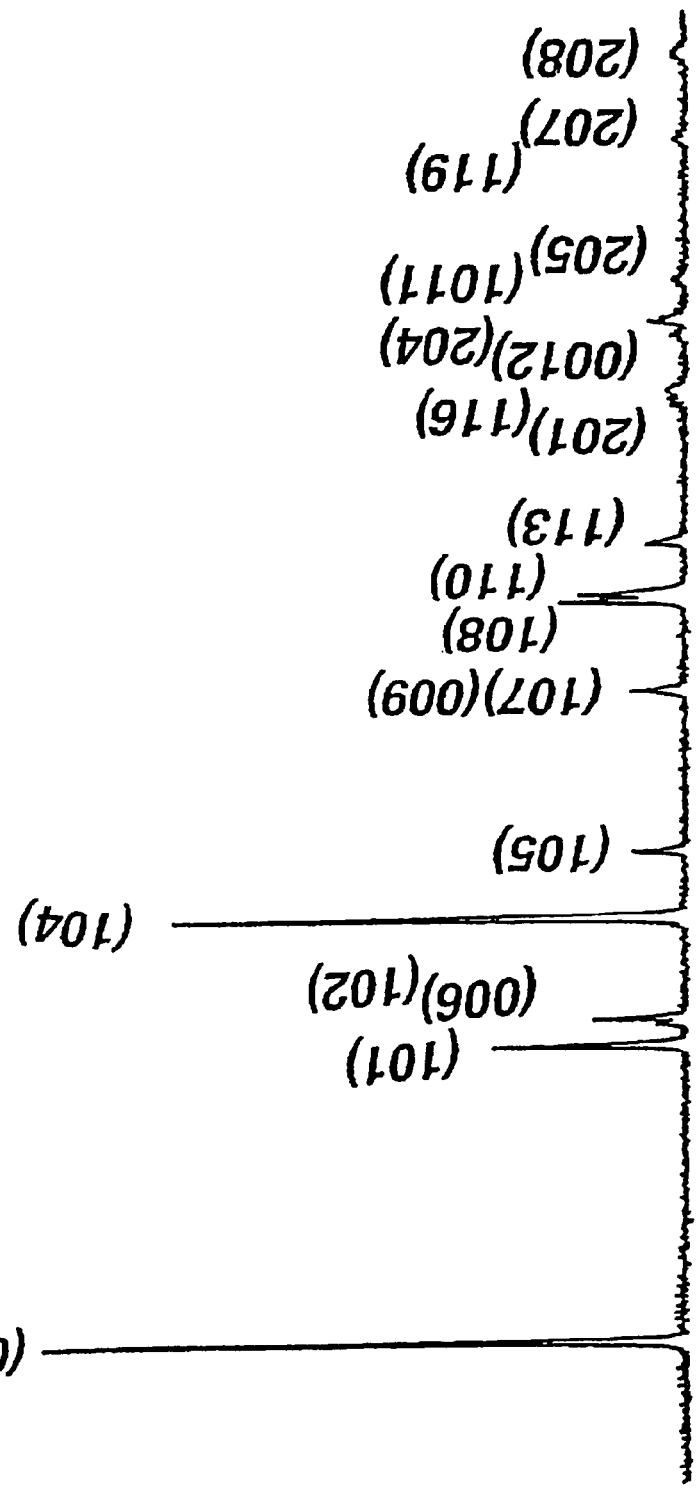
FIG. 1 is a diagram representing a X-ray diffraction pattern of the positive electrode active material in accordance with the present invention.

The present inventors conducted extensive research and development on a lithium-containing composite oxide including nickel and manganese, and found a positive electrode active material for a non-aqueous electrolyte secondary battery which represents an excellent function. They further found, in addition to conventional techniques to control the composition and the crystal structure of the lithium-containing composite oxide, controlling the oxidation state of nickel and manganese in a crystal gives a positive electrode active material having more excellent function.

First, it is based on the premise that the lithium-containing composite oxide of the present invention contains nickel and manganese and it is vital that the ratio thereof is 1:1 (the same ratio). It is also of importance that these elements are uniformly dispersed at nano level in the lithium-containing composite oxide.

It is also important that the lithium-containing composite oxide has a layered structure with lattice constants attributed to hexagonal crystal system of a=2.80 to 2.95 and c=13.8 to 14.4.

Controlling the oxidation state of nickel and manganese in the lithium-containing composite oxide, which is the prime characteristic of the present invention, will now be described. As mentioned above, there are various researches on the composition, the crystal structure and the synthesis method of a lithium-containing composite oxide, but there is hardly any research on the oxidation states of transition metals contained in the lithium-containing composite oxide such as nickel and manganese, although it is an important factor that affects the performance of the positive electrode active material obtained therefrom.

Some papers describe the oxidation state as noted earlier, but there are not seen any descriptions on the preferable oxidation state of each of the transition metals when the lithium-containing composite oxide including two or more of transition metals is used as the positive electrode active material for a non-aqueous electrolyte secondary battery. Particularly, there are no reports on controlling the oxidation states of these transition metals represents an excellent function.

Accordingly, the present invention is a result of research and development which had hardly ever been done, and discloses the preferable oxidation state of each of the transition metals in order to represent a new function when the lithium-containing composite oxide including two or more of transition metals is used as the positive electrode active material and a specific technique to practically realize the oxidation state and the new function obtained therefrom.

In addition to that, the present inventors also found that adding different kinds of elements to the lithium-containing composite oxide as the base material provides various added functions. By doping aluminum, for instance, the heat resistance of the crystal particles is improved, the electric potential is slightly increased, and the charge/discharge curve becomes flat. Doping cobalt improves the polarization characteristics. Further, doping magnesium enhances the electronic conductivity of the crystal particles. Furthermore, by using different kinds of elements, the amount of the gas generated due to the reaction between the surface of the crystal particle and the electrolyte can be increased or decreased.

In the following, the present invention will be described with reference to representative examples using cobalt, aluminum or magnesium as the third element, but it is to be understood that the elements other than those described above also exhibit a new function by using the lithium-containing composite oxide including nickel and manganese with a controlled oxidation state. Accordingly, those skilled in the art will easily recognize that other functions can be added by using various additional elements in the scope of the invention.

(1) Composition, Crystal Structure and Electrochemical Characteristics of Positive Electrode Active Material of the Present Invention The positive electrode active material of the present invention has a layered structure, and the attribution of the powdered XRD (X-ray diffraction) peaks can be performed by hexagonal crystal system. $LiCoO_2$, which is the most widely used positive electrode active material for a lithium secondary battery, has an electric capacity, relative to lithium metal, of 140 to 145 mAh/g at 4.3 V charge. A battery using a carbon material as the negative electrode is also designed so as to exhibit the same utilization rate. Accordingly, a battery, which fails to have the same or more capacity in the potential range, is not demanded now, thus not appealing in the market.

As the lithium-containing composite oxide including nickel and manganese, Qiming Zhong and J. R. Dahn et al. report an oxide having a spinel structure such as $LiNi_xMn_{2-x}O_4$ in J. Electrochem. Soc., 144(1), 205-213, 1997. As discussed in this specification, the composite oxide containing Mn and Ni with a spinel structure has a charge/discharge range of 4.1 V to 4.7 V, but it is difficult to use the composite oxide having a charge/discharge range of 4.7 V because of its high potential. In addition, its capacity is as small as 120 mAh/g. From these reasons, the composite oxide having a spinel structure is not preferable as the positive electrode active material for a lithium secondary battery intended to achieve a high capacity.

From this point of view, the lithium-containing composite oxide having the same layered structure as conventional $LiCoO_2$ is preferable as the positive electrode active material because it has a possibility to obtain a higher capacity. Thus, it is based on the premise that the positive electrode active material in accordance with the present invention has a working potential relative to lithium metal of 3.3 to 4.6 V and a charge/discharge capacity of not less than 150 mAh per gram. Herein, FIG. 1 shows the powdered X-ray diffraction pattern of $LiNi_{1/2}Mn_{1/2}O_2$ of the present invention. If the Miller indices are attributed to hexagonal crystal system having a layered structure, almost all of the peaks can be consistently analyzed in terms of strength; therefore, it is evident that the positive electrode active material of the present invention has a layered structure.

Next, the electrochemical characteristics in the case of applying the obtained positive electrode active material to the coin type battery were evaluated. The coin battery was fabricated in accordance with the following procedure. The positive electrode active material, acetylene black as the conductive material and a polyvinylidene fluoride resin (hereinafter referred to as "PVDF") as the binder were mixed in a weight ratio of 80:10:10, to form a molded article in the shape of sheet. The molded article was then punched in the shape of a disc and dried at a temperature of 80° C. for about 15 hours in vacuo, to obtain the positive electrode. On the other hand, a sheet made of lithium metal was punched in the shape of a disc to form the negative electrode. A microporous polyethylene film was used as the separator, and the electrolyte was prepared by dissolving 1 mol of $LiPF_6$ into a solvent mixture of EC (ethylene carbonate) and EMC (ethyl methyl carbonate) in a volumetric ratio of 1:3. Using these materials, a coin battery of 2016 size (20 mm in diameter and 1.6 mm in thickness) was fabricated by a conventional method.

Thus fabricated coin type battery was charged and discharged at a constant current rate of between 2.5 and 4.6 V at the 10 hour rate. It is found that the charge/discharge capacity was 180 mAh/g and the discharge voltage was at 4 V level.

Figure 2:
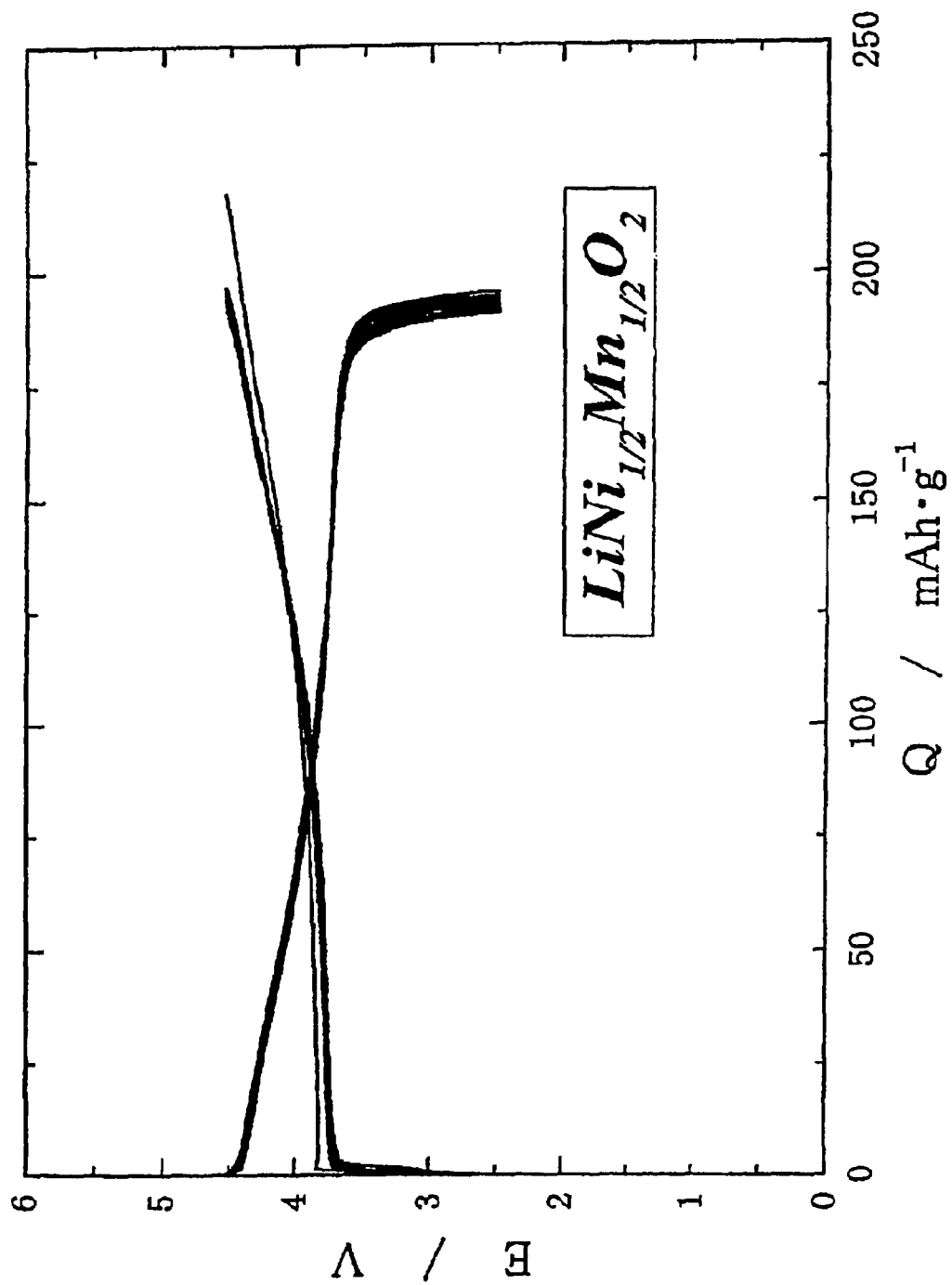
FIG. 2 is a graph showing a charge/discharge curve of a coin type battery using the positive electrode active material.

FIG. 2 shows a charge/discharge curve of the coin type battery. As apparent from FIG. 2, the degree of the polarization due to charging and discharging is extremely small. Unlike the positive electrode active material containing nickel and manganese with a spinel structure described in the above, this charge/discharge curve is almost flat and level. The discharge potential was sufficient enough to be used as 4 V level positive electrode active material for a non-aqueous electrolyte secondary battery.

This charge/discharge curve clearly differs in shape from that of $LiNiO_2$ with a slight inclination or that of $LiMnO_2$ with a discharge potential of 3 V level. It is also evident that it differs from that of $LiCoO_2$ in potential and shape of the charge/discharge curve.

This proves that the obtained positive electrode active material is a new material with a working potential relative to lithium metal of 3.3 to 4.6 V and a charge/discharge capacity of not less than 150 mAh per gram, which is extremely preferable as a lithium secondary battery intended to achieve a high capacity.

In order to analyze the reaction mechanisms of the positive electrode active material accompanied by the charge/discharge reaction, changes in the crystal structures were investigated. The experiment was conducted using the aforementioned coin type battery. The coin type battery was charged and discharged at some intervals, and was then disassembled to analyze the changes in the crystal structures of the positive electrode active material using a X-ray diffractometer. The positive electrode taken out from the coin type battery after the disassembly process also contained acetylene black as the conductive material and PVDF as the binder. The analysis was performed in a polyethylene bag in order to minimize the dissolution and the effect of water during the measurement. The volume change in the crystal lattice accompanied by charging and discharging was calculated using the lattice constant obtained from the X-ray diffraction. As a result, it was found that the volume decreases with the charging. The a-axis and c-axis decreases and increases respectively by charging, while the volume decreases. The volume of the crystal lattice was sharply decreased from 104 to 101 cubic angstrom (charging capacity: 180 mAh/g) in the state of discharge.

This phenomenon is of great importance to the positive electrode active material. Currently, in a battery system in which a lithium secondary battery is mainly used, $LiCoO_2$ is employed as the positive electrode active material and graphite as the negative electrode active material. The lattice volume of $LiCoO_2$ in the positive electrode increases with oxidation (charging). Graphite also expands because Li ions intercalate between the layers. Therefore, both positive and negative electrodes in this battery system expand during charging. This expansion is disadvantageous to the battery; specifically, the expansion crushes the separator, causing internal short-circuit in some cases. In order to deal with such an expansion, there may be some cases to reduce the filling capacity right from the start. Additionally, in a slim battery, the battery itself expands, reducing the advantage of slimness.

However, if an active material whose lattice volume decreases with oxidation as mentioned above can be used, the expansion of the negative electrode can be absorbed to some extent, which will solve the expansion problem of the whole batteries. Thus, as opposed to the positive electrode active material which expands due to charging like $LiCoO_2$, the positive electrode active material of the present invention whose volume stabilizes constantly or decreases during charging is particularly of value when it is used with the negative electrode containing a material which expands during charging such as graphite.

The specific properties of the charge/discharge behavior of the positive electrode material in accordance with the present invention are now further described. $LiCoO_2$, $LiNiO_2$ and $LiMnO_2$ having a layered structure have the electric potentials of 4 V, 3.7 V and 3 V respectively. Accordingly, when a 4 V level active material having a layered structure is prepared, Co and Ni are usually combined together, but an attempt is made to add a trace amount of the third element in order to stabilize the crystal structure while the electric potentials of the elements are retained. U.S. Pat. No. 5,264,201 discloses an active material represented by the formula $Li_xNi_{2-x-y}M_yO_2$ wherein $0.8 \leq x \leq 1.0$, $y \leq 0.2$, and $y < 0.5$ in the case of M being Co. It also discloses that the additional element M is Co, Fe, Ti, Mn, Cr and V.

As is apparent from this prior art example, numerous examples of the additional element M relative to Ni and that the added amount thereof is trace are shown. Accordingly, there is no disclosure or suggestion of the method in which the additional element is added while retaining the characteristics of electric potential of Ni, and the electric potential is controlled by the combination of the additional elements. The patent publication mentions only Co whose added amount is large; thus, it seems that such a combination of Co and Ni is examined just because it is conventionally known that Co has a high electric potential and the electric potential of Co nearly equals to that of Ni.

Further, Japanese Laid-Open Patent Publication No. Hei 04-267053 discloses an active material represented by the formula $Li_xM_yN_zO_2$ wherein M is Fe, Co or Ni, and N is Ti, V, Cr or Mn and describes that the element M realizes the voltage of 4 V and the element N stabilizes the structure.

Japanese Laid-Open Patent Publication No. Hei 10-69910 proposes an active material synthesized by a coprecipitation synthesis method, represented by the formula $Li_{y-x1}Ni\ x_{1-x2}M_xO_2$ wherein M is Co, Al, Mg, Fe, Mg or Mn, $0 < x_2 \leq 0.5$, $0 \leq x_1 < 0.2$, $x = x_1 + x_2$, and $0.9 \leq y \leq 1.3$. This patent publication describes that the discharge capacity is inherently small if M is Mn, and the essential function of the positive electrode active material for a lithium secondary battery intended to achieve a high capacity is dismissed if $x_2$ is more than 0.5. $LiNi_{0.6}Mn_{0.4}O_2$ is exemplified as a material having the highest proportion of Mn.

The conception of the prior art examples clearly differs from that of the present invention. The present invention relates to a lithium-containing composite oxide containing nickel and manganese which represents a new function by precisely controlling the crystal structure, the composition of nickel and manganese and their oxidation states, which is completely different from the conception of the above-mentioned prior art examples.

(2) Oxidation State (Valence) of Nickel and Manganese in Lithium-Containing Composite Oxide of the Present Invention From the view point of composition, the lithium-containing composite oxide of the present invention must simultaneously contain nickel and manganese. Regarding the ratio of nickel and manganese, the atomic ratio of 1:1 is preferable. The oxidation state of each element is, however, more important than the composition. The prime effect of the present invention is to simultaneously control the oxidation states of nickel and manganese. The effects described below can be achieved by adjusting the nickel valence to bivalent and the manganese valence to tetravalent when the positive electrode active material of the present invention is synthesized.

Qiming Zhong and J. R. Dahn et al. report, in J. Electrochem. Soc., 144(1), 205-213, 1997, that the oxidation state of an oxide having a spinel structure such as $LiNi_xMn_{2-x}O_4$ is represented by $Li^{+1}Ni_x^{+2}Mn_{1-2x}^{+3}Mn_{1-x}^{+4}O_4^{-2}$. They further report that, in the charge/discharge curve of this material, the flat part at 4.1 V corresponds to the oxidation-reduction of $Mn^{3+}$ and $Mn^{4+}$ and the flat part at 4.7 V corresponds to the oxidation-reduction of $Ni^{2+}$ and $Ni^{4+}$. All of the oxides mentioned in this paper have a spinel structure, and the composite oxide containing Mn and Ni has a high potential of 4.7 V in the charge/discharge range.

As described above, the present invention has a layered structure and a discharge potential of 4.6 V or less, and is intended to have a capacity of 150 mAh/g or more; accordingly, the present invention completely differs from the oxide having a spinel structure shown in the paper.

Regarding the oxides having a layered structure such as $LiCoO_2$ and $LiNiO_2$, E. Rossen and J. R. Dahn et al. report, in Solid State Ionics, 57(3-4), 311-18, 1992, that $Mn^{4+}$ exists in $Li_xMn_yNi_{1-y}O_2$ and that the capacity decreases as the amount of $Mn^{4+}$ is increased. Furthermore, B. J. Neudecker, J. B. Bates et al. report, in J. Electrochem. Soc., 145(12) 1998, that the XPS measurement revealed the existences of $Mn^{3+}$ and $Mn^{4+}$, and $Ni^{2+}$ in $Li_x(Mn_yNi_{1-y})_{2-x}O_2$. However, they note that $Ni^{2+}$ exists on the surface of the particle while $Ni^{3+}$ exists inside the particle.

As just mentioned above, those papers describe the valencies of manganese and nickel but simply discuss the analytical results of conventional positive electrode active materials. The former paper describes that the existence of $Mn^{4+}$ in materials with high capacity causes a capacity degradation, which contradicts the description of the present invention. The latter report describes that $Ni^{2+}$ exists only on the surface of the crystal particle and inside thereof exists $Ni^{3+}$, which also differs from the positive electrode active material of the present invention in which $Ni^{2+}$ also exists inside the crystal particle.

Additionally, these papers are completely silent on the effect of the present invention. They do not provide any future suggestions on simultaneously controlling the valencies of nickel and manganese to represent a new function. Accordingly, the positive electrode active material of the present invention differs from that of the prior art examples mentioned above in the technical idea, the configuration and the effect.

Below is shown one of the analytical results of the oxidation states of nickel and manganese in the positive electrode active material of the present invention. Herein, $LiNi_{1/2}Mn_{1/2}O_2$ and $LiNi_{1/3}Mn_{1/3}Co_{1/3}O_2$ were analyzed. For comparison, $LiNi_{1/2}Co_{1/2}O_2$ without Mn was also analyzed in the same way. The synthesis method for the positive electrode active material of the present invention will be described later in this specification.

In order to measure the oxidation states of nickel and manganese in the positive electrode active material, X-ray Absorption Near-K-Edge Structure (XANES) was performed. The following shows the equipment and conditions used for the experiment.

Experimental facility: SPring-8
Beam line: BL16B2
Measured temperature: Room temperature
Measured energy range: Near K-shell of Mn, K-shell of Co and K-shell of Ni
Analyzing crystal: Si (111)
Beam size: 1 mm×2 mm In order to determine the oxidation number, a calibration curve was prepared using comparative samples. MnO, $Mn_2O_3$ and $Li_2MnO_3$ were used as standard control samples containing manganese with a valence of 2+, 3+ and 4+. Likewise, NiO, $LiNiO_2$ and $NiO_2$ were used as standard samples containing nickel with a valence of 2+, 3+ and 4+. For reference, CoO and $LiCoO_2$ were used as standard samples containing cobalt with a valence of 2+ and 3+. In the analysis, the absorption maximum observed in the X-ray absorption near-K-edge structures of nickel, manganese and cobalt were numerically determined.

Figure 5:
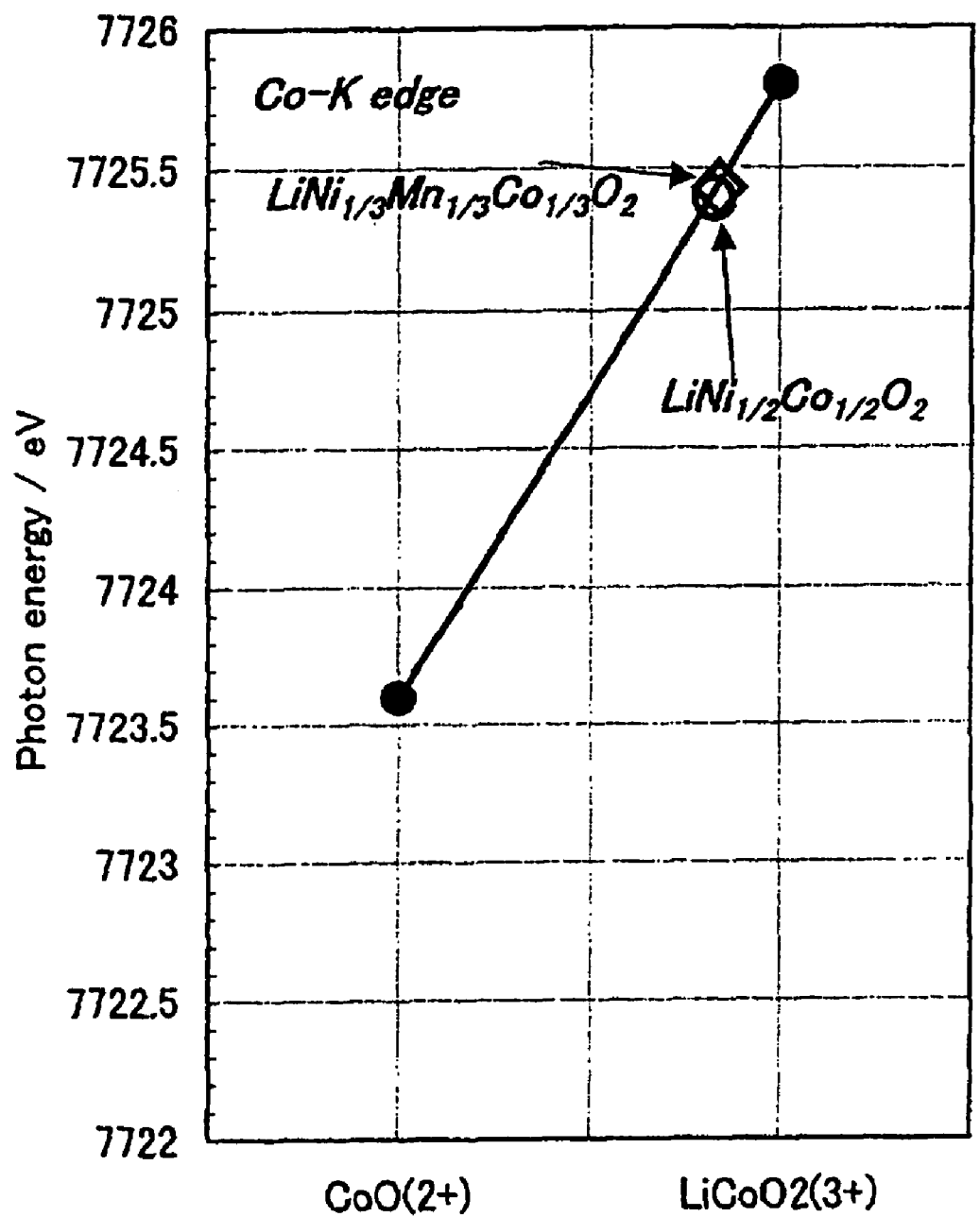
FIG. 5 is a graph obtained from the results of XANES measurement of the positive electrode active materials of the present invention which is used to estimate Co valence.

FIGS. 3, 4 and 5 show the oxidation states of manganese, nickel and cobalt respectively. FIG. 3 shows an oxidation state of the positive electrode active materials containing manganese, and the vertical axis shows energy determined from the absorption maximum observed in the X-ray absorption near-K-edge structures of manganese. It is evident from FIG. 3 that the measuring points of the positive electrode active materials including bivalent, trivalent and tetravalent manganese form a fairly straight line. The measuring values of $LiNi_{1/2}Mn_{1/2}O_2$ and $LiNi_{1/3}Mn_{1/3}Co_{1/3}O_2$ are plotted on the calibration curve, which are represented by triangular and rhombic dots ($\Delta$ and $\Diamond$) respectively in the graph. This proves that the oxidation states of manganese contained in $LiNi_{1/2}Mn_{1/2}O_2$ and $LiNi_{1/3}Mn_{1/3}Co_{1/3}O_2$ are in the range of 3.5 to 4.0 and that each manganese is nearly tetravalent from the chemical principles.

FIG. 4 shows the oxidation states of nickel. Likewise, the measuring points of the positive electrode active materials including bivalent, trivalent and tetravalent nickel, which were obtained from the energy determined from the absorption maximum observed in the X-ray absorption near-K-edge structures of nickel, form a fairly straight line and the measuring values of $LiNi_{1/2}Mn_{1/2}O_2$ and $LiNi_{1/3}Mn_{1/3}Co_{1/3}O_2$ are plotted on the calibration curve, which are represented by triangular and rhombic dots ($\Delta$ and $\Diamond$) respectively in the graph. Accordingly, the oxidation states of nickel contained in these positive electrode active materials are in the range of 2.0 to 2.5, and it is presumed from the chemical principles that each nickel is nearly bivalent. For reference, the analytical result of $LiNi_{1/2}Co_{1/2}O_2$ is also shown in the graph. In this case, it is presumed from the graph that nickel is trivalent.

FIG. 5 shows the oxidation states of cobalt. The oxidation state of cobalt contained in $LiNi_{1/3}Mn_{1/3}Co_{1/3}O_2$ is trivalent ($\Diamond$). It is also presumed that the oxidation state of cobalt contained in $LiNi_{1/2}Co_{1/2}O_2$ used for comparison is trivalent ($\bigcirc$).

From the above, $LiNi_{1/2}Mn_{1/2}O_2$ and $LiNi_{1/3}Mn_{1/3}Co_{1/3}O_2$ of the present invention contain nearly tetravalent manganese and nearly bivalent nickel; thus, the total of the oxidation numbers are also satisfied. It is to be noted that cobalt is trivalent.

Next, the effect of the positive electrode active material of the present invention will be described.

It is already shown that nickel and manganese contained in the positive electrode active material of the present invention are bivalent and tetravalent respectively, and this exhibits particularly two effects described below.

The first effect of the positive electrode active material of the present invention is that the cycle life is excellent; especially, the cycle life under high temperatures is long. The second effect is that the storage characteristics are outstanding. The specific magnitudes of these effects will be described later in Examples, but the mechanisms thereof are presumably as follows.

The prior art examples do not describe a positive electrode active material having a layered structure, but describe a positive electrode active material having a spinel structure. As described in Japanese Laid-Open Patent Publication No. Hei 13-202959, etc., the use of a manganese-containing composite oxide having a spinel structure which exhibits an electric potential of 4 V as the positive electrode active material would involve serious problems such as decrease in cycle life and deterioration in high temperature storage characteristics.

To be more specific, the publication describes as follows: "the use of a lithium manganese composite oxide comprising a material, which is synthesized using only manganese, as the positive electrode active material for a lithium ion secondary battery would involve serious problems such as poor cycle life characteristics and impairment of the battery performance when used or stored under high temperatures. In order to deal with such problems, there is proposed a method in which part of manganese is replaced with a metal element such as chromium, nickel or cobalt; thereby, it is found that the stability of the crystal structure is enhanced, eventually the cycle life characteristics and the high temperature storage characteristics are improved".

As described above, an additional element is added to the positive electrode active material containing manganese and with a spinel structure in order to improve the cycle life characteristics and high temperature storage characteristics and to strengthen the crystal structure.

Japanese Laid-Open Patent Publication No. 2000-77071 discloses that the deterioration of the material containing manganese is ascribed to the dissolution of manganese. This prior art example, which is intended merely to obtain the mixture with the use of the improved method, differs from the conception of the present invention, but is provided herein as reference.

Japanese Laid-Open Patent Publication No. 2000-77071 proposes that the lithium nickel composite oxide having a prescribed specific surface are or D50 particle size is mixed with the manganese oxide having a spinel structure. Thereby, the lithium nickel composite oxide catches hydrogen ions to reduce the dissolution of manganese. It is presumed that, for example, hydrogen ions are incorporated and instead Li ions are discharged in this reaction.

The publication also describes that the lithium nickel composite oxide may functions somewhat as a catalytic poison to the reaction among lithium manganese composite oxide, electrolyte and water. In either case, both of these descriptions relate to a manganese-containing composite oxide having a spinel structure and there is no description on a positive electrode active material having a layered structure like the present invention. Further, the conception that the oxidation states of manganese and nickel contained in a composite oxide are controlled to improve the battery performance is not disclosed or suggested. The technique to improve the degradation of the cycle life due to the dissolution of manganese is also not found in publications regarding the active material having a layered structure.

The positive electrode active material having a layered structure of the present invention contains manganese and nickel, but the amount of dissolved manganese is considerably small. Accordingly, the reduction of the dissolution of manganese improves the cycle life and the storage characteristics. Manganese is usually bivalent when it is dissolved in an electrolyte. Trivalent manganese undergoes a heterogeneous reaction to form tetravalent manganese and bivalent manganese, and the bivalent manganese is dissolved in an electrolyte. From this, the present inventors have noticed that if the oxidation state of manganese is made tetravalent, the dissolution of manganese can be reduced, and thus have completed the present invention.

The analytical result by X-ray Absorption Near-K-Edge Structures (XANES) has proved that manganese contained in the positive electrode active material of the present invention is tetravalent. Accordingly, it is possible to greatly reduce the dissolution of manganese by adjusting the manganese valence to tetravalent even if water enters an electrolyte to produce a small amount of protons.

The mechanisms on how the dissolution of manganese harmfully affects cycle life and storage characteristics will now be described. It was found that when manganese ions leave the positive electrode and reach the negative electrode, organic matters containing manganese and lithium are deposited to form a film. When $LiPF_6$ was used as the electrolyte, phosphorus was detected from this film. As a result of the composition analysis of the film, it was also found that about 40 lithium ions are contained per one manganese ion. This is because lithium ions, which were intercalated in the negative electrode, are extracted and incorporated into the film.

From this result, it is presumed that even if a trace amount of manganese is dissolved, approximately 40 times of that amount of lithium ions becomes inert, thus significant capacity degradation occurs. Further, it is easily presumed that the above-mentioned film prevents the movement of lithium ions accompanied by charging and discharging, which considerably degrades the discharge characteristics of the obtained battery.

Since the velocity of dissolution of manganese ions increases under high temperatures, the improvement of dissolution of manganese affects the cycle life and storage characteristics under high temperatures. This is considered to be the cause of the degradation of the cycle life.

On the other hand, it is conceivable that only adjusting the manganese valence to tetravalent cannot ensure sufficient charge/discharge capacity. In the present invention, however, the adjustment of the nickel valence to bivalent allows the charging and discharging between bivalent nickel and trivalent nickel based on the movement of two electrons, therefore, sufficient charge/discharge capacity can be ensured. It is noted that the presence of manganese is inevitable in order to adjust the nickel valence to trivalent. It is conceivable that nickel and manganese exchange electrons with each other in the oxide having a layered structure, they turn into a stable form respectively by the electron movement from manganese to nickel. Thus, they turn into $Ni^{2+}$ and $Mn^{4+}$ instead of $Ni^{3+}$ and $Mn^{3+}$. Since this phenomenon does not occur in Co, nickel and cobalt in $LiNiCoO_2$ remains in $Ni^{3+}$ and $Co^{3+}$. Accordingly, manganese is inevitable in order to obtain $Ni^{2+}$.

For comparison, the measurement result of $LiNi_{1/2}Co_{1/2}O_2$ is shown in FIG. 4, and it has become evident that nickel contained therein is trivalent.

Summing up the above, in order to solve all the problems such as the electric potential curve and safety of $LiNiO_2$, improvement of the low electric potential of $LiMnO_2$ as 3 V, dissolution of manganese ions and ensuring a high capacity of 150 mAh/g or more in a 4 V level, which is difficult to achieve by a spinel structure, it is vital to obtain a positive electrode active material containing at least both nickel and manganese whose valences are adjusted to bivalent and trivalent respectively. Additionally, the valences of nickel and manganese determined in the same way as above were bivalent and trivalent respectively in the range of 2.5 to 3.5 V relative to lithium metal.

(3) Production Method of Positive Electrode Active Material of the Present Invention Then, a typical production method of a positive electrode active material of the present invention will be specifically described. However, it will be recognized that the invention is not limited to the method given hereinafter, those skilled in the art can use numerous other methods by adjusting the composition and structure mentioned above as well as the valences of nickel and manganese in the scope of the invention.

In the positive electrode active material of the present invention, it is regarded that a nickel atom and a manganese atom are adjacent each other and an oxygen atom and a lithium atom are in an appropriate location to the nickel and manganese atoms, thereby controlling the valences of nickel and manganese.

With this in mind, the present inventors employed a mechanical alloying process capable of controlling the mixture of constituent elements at nano level in order to synthesize a precursor for the positive electrode active material. This method can change the mixing degree by using various parameters such as the number of revolutions, time and ball-diameter. One specific example of the equipment is PLANETARY BALL MILL PM-1200 manufactured by SEISHIN ENTERPRISE CO, LTD. This equipment gives a high centrifugal force to balls in three pots with the rotation and the revolution of the pots on the turning table by means of gears.

For instance, an oxide containing nickel such as NiO, an oxide containing manganese such as MnO and lithium hydroxide were mixed in a predetermined ratio and fed into the pots in the ball mill. At this time, it is ideal that the atomic ratio of lithium to nickel and manganese satisfies Li/transition metals (i.e. Ni and Mn)=1. However, each amount may be increased or decreased slightly depending on the baking temperature and the particle shape. For example, when the baking temperature is high, or when larger primary particles are necessary, a little more amount of lithium is added. In this case, the amount of lithium is preferably increased or decreased by about 3%.

As an alternative example, there was used a wet mechanical alloying process in which water was simultaneously fed with the raw materials into a ball mill with ½-inch balls made of alumina. Fifteen balls were placed in each pot with a volume of 400 ml; the revolution per minute was set to be 200 rpm and the ratio of revolution to rotation to be 1.25. After operation of the ball mill for 24 hours, the lithium-containing oxide was synthesized. Because the pots were sealed under an argon atmosphere, the atmosphere therein was inert. The obtained lithium-containing composite oxide was filtered and dried.

The synthesis conditions are not limited to the above, and the numbers of revolution and rotation, time and ball-diameter may be changed depending on the desired positive electrode active material. The performance of the positive electrode active material obtained under various conditions cannot be sufficiently determined only by X ray structural analysis after baking; in the present invention, in particular, it is necessary to confirm whether the valence is adjusted or not by using XANES or the like.

The preferable baking conditions will be then described. It is acceptable as long as the baking atmosphere is an oxidizing atmosphere. Here, baking was performed in an original atmosphere. The temperature was raised right up to 1000° C. and the lithium-containing composite oxide obtained by the mechanical alloying process was baked at that temperature for 10 hours. When the temperature was to be decreased after completion of baking, the mixture was annealed once at 700° C. for 5 hours and then slowly cooled. When the oxide is baked, oxygen is likely to be deficient at a temperature over 1000° C. In order to prevent the oxygen deficiency, annealing process at 700° C. was carried out to recover the lost oxygen after completion of baking. At this time, blowing oxygen or the like can enhance the effect of annealing.

(4) Particle Shape of Positive Electrode Active Material of the Present Invention FIG. 6 shows one example of SEM (Scanning Electron Microscopy) images of the positive electrode active material of the present invention comprising the lithium-containing nickel manganese composite oxide obtained above. FIGS. 6 (*a*) and (*b*) show the images obtained at a magnification of 1000 and 30000 respectively. As apparent from these images, the obtained various positive electrode active materials are composed of primary particles having a diameter of 0.1 to 2 μm and secondary particles having a diameter of 2 to 20 μm.

Incidentally, the description herein is primarily about nickel and manganese; the addition of an element such as cobalt to the positive electrode active material may slightly change the surface condition of the particles, but the effect of the present invention will not be impaired and it is preferable that the sizes of the primary and secondary particles are in the above-mentioned range.

Figure 7:
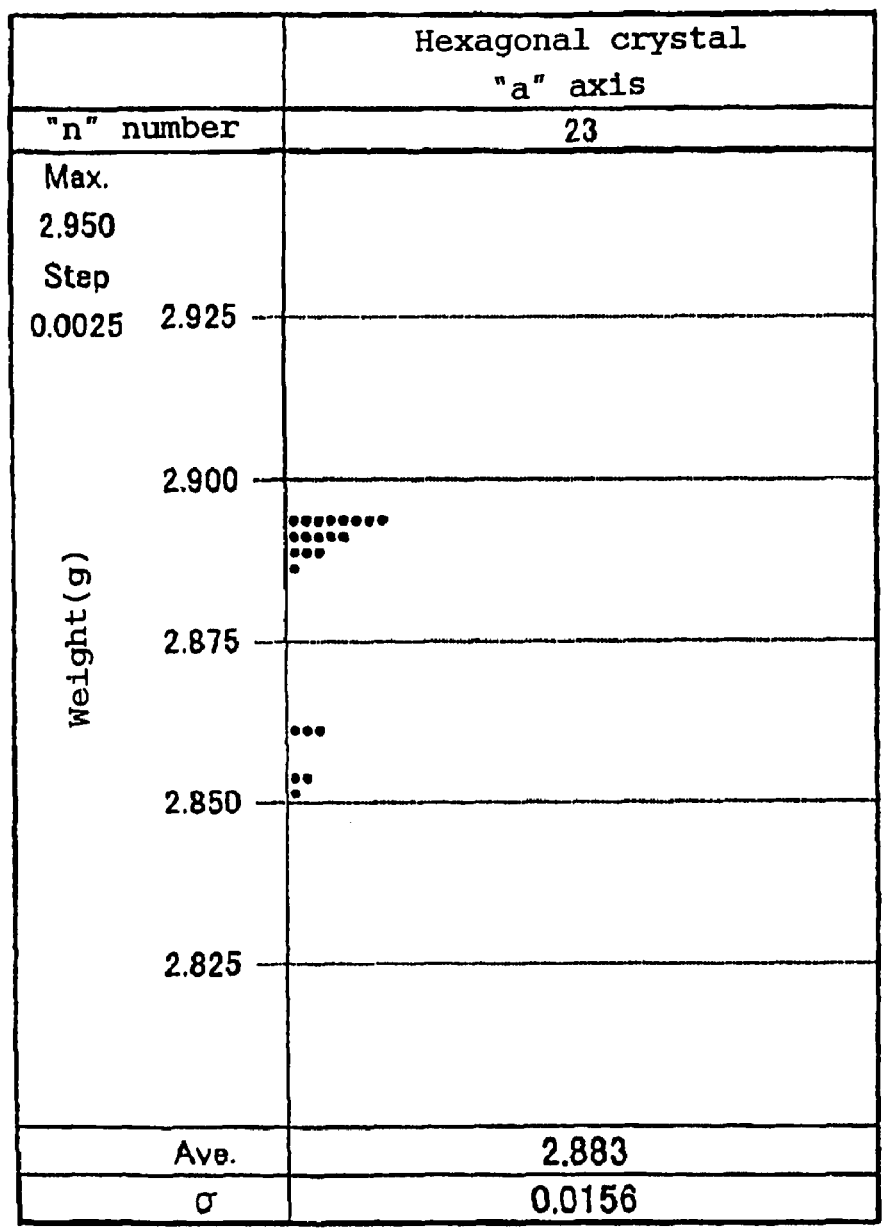
FIG. 7 is a graph showing variation in lattice constants (a axis) of the positive electrode active material.
Figure 8:
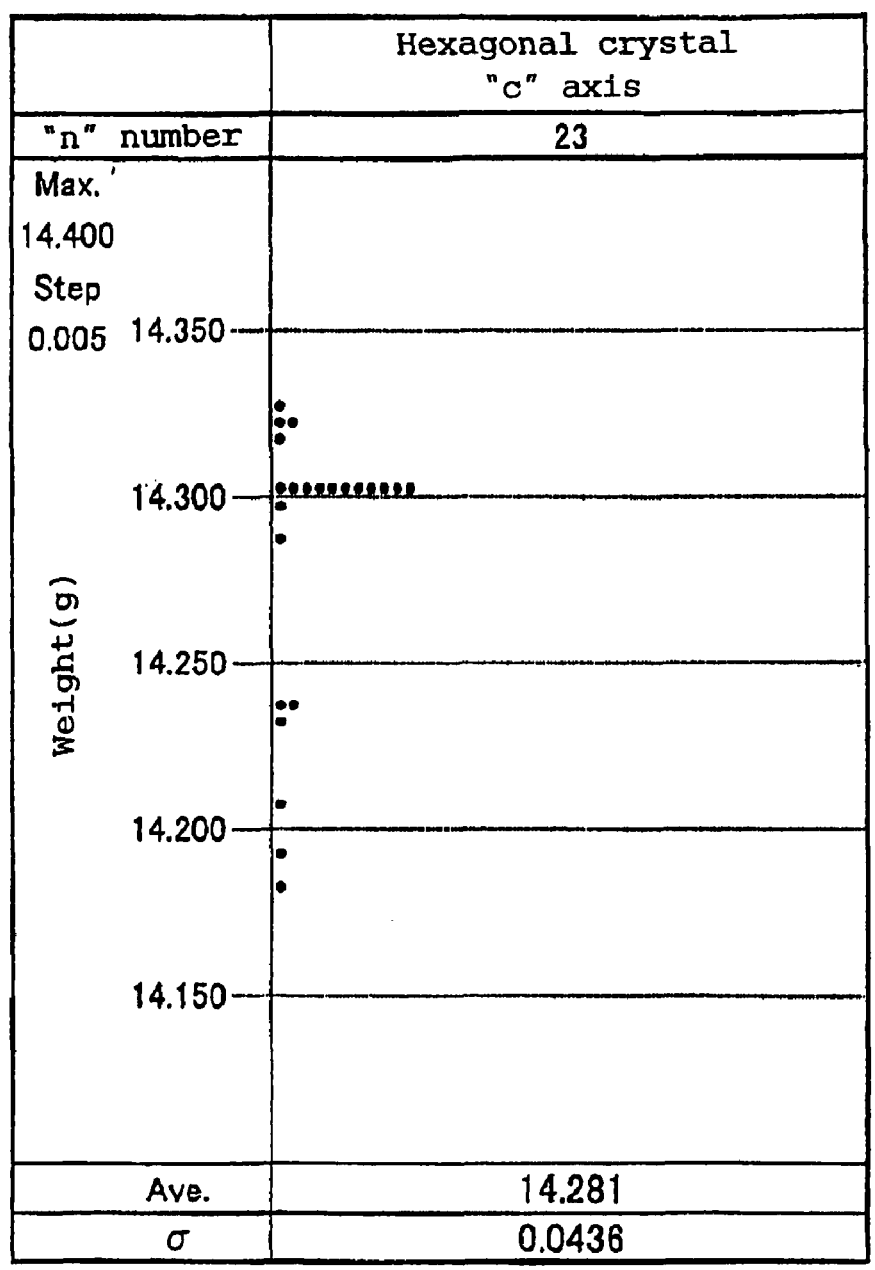
FIG. 8 is a graph showing variation in lattice constants (c axis) of the positive electrode active material.

(5) Lattice Constant of Positive Electrode Active Material of the Present Invention The positive electrode active material of the present invention containing nickel and manganese was prepared by the production method explained in the above (3) and the crystal structure and the lattice constant were determined by X-ray diffraction. FIGS. 7 and 8 respectively show "a" axis and "c" axis attributed to hexagonal crystal system having a layered structure. Although the lattice constants slightly changed depending on the composition, their charge/discharge and cycle life characteristics were the same as those of the positive electrode active material of the present invention described above.

The variations (δ values) of the lattice constants can be calculated from the results shown in FIGS. 7 and 8. The values are expressed in δ value in the figures. From the results of FIGS. 7 and 8, six δ value and our conventional data, the range of lattice constant "a" is preferably 2.80 to 2.95, and the range of lattice constant "c" is preferably 13.8 to 14.4.

(6) Characteristics of Positive Electrode Active Material of the Present Invention While the present inventors were researching, there were cases where the composition ratio of nickel and manganese was slightly changed because of various factors. These changes were verified against the characteristics of the battery using the positive electrode active material having a changed composition to find that the more equal the ratio of nickel and manganese contained in the positive electrode active material is, the more excellent characteristics the positive electrode active material exhibits. The range of the change is within 10%, which is within the allowable range.

It has become apparent that the oxide containing nickel and manganese incorporated substantially at the same ratio represents a new function in the present invention. It can easily be expected that addition of a different kind of element (an additional element or a dopant) to the oxide can give an additional value.

Therefore, it is of importance that the positive electrode active material of the present invention contains two transition metals at the substantially same ratio; as far as most of the crystal particles comprising the above-mentioned oxide has the aforesaid crystal structure and its function is not impaired, a different kind of element other than those described above may be added. Particularly, since the crystal particle is granular, it is practical to make such an additional element included in the vicinity of the surface of the crystal particle. The present invention includes any of positive electrode active materials having an additional function due to the additional element.

The examples of the different kind of element may include cobalt, aluminum, magnesium, calcium, strontium, yttrium and ytterbium. The polarization of the positive electrode active material is reduced by doping cobalt. Further, the electric potential of the positive electrode active material is somewhat increased and the thermal stability thereof is improved simultaneously by doping aluminum. In this case, when the compound containing nickel, manganese and lithium obtained by the mechanical alloying process mentioned above is baked, an appropriate amount of element source such as cobalt hydroxide or aluminum hydroxide is mixed at the same time. Thereby, cobalt and aluminum are not uniformly doped into the oxide particle including the inside thereof, which is obtained through a eutectic reaction; the concentration of aluminum doped only into the vicinity of the surface of the crystal particle becomes higher. This can be confirmed by a characteristic X-ray diffraction analysis of the crystal particle, or the like.

With doping, therefore, a main body of the crystal particle constituting the positive electrode active material can retain the effect of nickel and manganese, and the aforesaid effect can be added because only the state of the surface of the crystal particle changes.

Even when cobalt was uniformly doped into the oxide particle, the effect of the present invention was not impaired and the effect of cobalt to reduce the polarization was obtained. It was confirmed that cobalt or aluminum is in a trivalent state in the crystal lattice. The XANES result of $LiNi_{1/3}Mn_{1/3}Co_{1/3}O_2$ shown in FIGS. 3 and 4 has revealed that cobalt is trivalent.

It is to be noted that, since the effect of nickel and manganese is decreased with increase in added amount of aluminum, it is effective to distribute aluminum somewhat mainly to the surface of the crystal particle. Strontium, yttrium and the like can also impart an effect of improving heat resistance. Further, addition of magnesium allows the electronic conductivity of the positive electrode active material to be one order or two of magnitude greater. In this case alike, magnesium hydroxide may be mixed with the compound obtained by the mechanical alloying process to be baked. Baking may also be conducted in the aforesaid manner.

When the positive electrode active material as thus obtained is used for a battery, the battery has an extremely high electronic conductivity so that it is possible to decrease an amount of a conductive agent so as to increase the battery capacity. It is effective that the total added amount of those different kinds of elements is 0.05 to 20 atom % of the total amount of the aforesaid two transition metals (nickel and manganese). With the added amounts out of this range, problems may arise: when it is less than 0.05 atom %, a sufficient effect cannot be obtained; when it is more than 20 atom %, the capacity decreases.

(7) Non-Aqueous Electrolyte Secondary Battery

In the following, a description will be given of other constituent materials that can be used when fabricating a non-aqueous electrolyte (lithium) secondary battery using the positive electrode active material of the present invention.

The electrically conductive material used in the positive electrode material mixture for the production of the positive electrode of the present invention is not limited to a particular material, but any electronically conductive material can be used as long as the material does not cause any chemical change in the fabricated battery. Examples include: graphites such as natural graphite (scale graphite and the like) and artificial graphite; carbon blacks such as acetylene black, Ketjen black, channel black, furnace black, lamp black and thermal black; electrically conductive fibers such as carbon fiber and metallic fiber; metallic powders such as carbon fluoride powder, copper powder, nickel powder, aluminum powder and silver powder; electrically conductive whiskers such as zinc oxide whisker and potassium titanate whisker; electrically conductive metal oxides such as titanium oxide; and electrically conductive organic materials such as polyphenylene derivatives.

These materials can be used alone or in any combination thereof within the scope that does not impair the effect of the present invention.

Among them, artificial graphite, acetylene black and nickel powder are particularly preferable. The amount of the electrically conductive material to be added is not particularly specified, but from 1 to 50% by weight is preferable, and from 1 to 30% by weight is particularly preferable. In the case of carbon and graphite, from 2 to 15% by weight is particularly preferable.

For the binder used in the positive electrode material mixture of the present invention, a polymer having a decomposition temperature of 300° C. or higher is preferable. Examples include polyethylene, polypropylene, polytetrafluoroethylene (PTFE), polyvinylidene fluoride (PVDF), tetrafluoroethylene-hexafluoroethylene copolymer, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer, and vinylidene fluoride-perfluoromethyl vinyl ether-tetrafluoroethylene copolymer. These materials can be used alone or in any combination thereof within the scope that does not impair the effect of the present invention.

Among them, polyvinylidene fluoride (PVDF) and polytetrafluoroethylene (PTFE) are most preferable.

The material, which constitutes the current collector for the positive electrode is not limited to a particular material, but any electronically conductive material can be used as long as the material does not cause any chemical change in the fabricated battery. The current collector may comprise, for example, stainless steel, nickel, aluminum, titanium, various alloys or carbons, or a composite material such as aluminum or stainless steel with the surface thereof treated with carbon, nickel, titanium or silver.

Among them, aluminum or an aluminum alloy is preferable. The surface of these materials may be treated with oxidization. Also, the surface of the collector may be roughened by surface treatment. As for the current collector shape, any shape commonly employed in the field of batteries can be used. Examples of the shape include a foil, a film, a sheet and a net, a punched sheet, a lath body, a porous body, a foamed body, fibers and a non-woven fabric. The thickness is not particularly specified, but the thickness of from 1 to 500 μm is preferable.

The negative electrode active material used in the present invention can comprise a compound, which can absorb and desorb a lithium ion, such as lithium, alloys such as lithium alloys, intermetallic compounds, carbon, organic compounds, inorganic compounds, metal complexes and organic polymer compounds. These materials can be used alone or in any combination thereof within the scope that does not impair the effect of the present invention.

As the lithium alloys, there are exemplified Li—Al based alloys, Li—Al—Mn based alloys, Li—Al—Mg based alloys, Li—Al—Sn based alloys, Li—Al—In based alloys, Li—Al—Cd based alloys, Li—Al—Te based alloys, Li—Ga based alloys, Li—Cd based alloys, Li—In based alloys, Li—Pb based alloys, Li—Bi based alloys, Li—Mg based alloys and the like. In this case, the lithium content is preferably 10% by weight or higher.

As the alloy and intermetallic compounds, there are compounds of a transition metal and silicon, compounds of a transition metal and tin and the like. A compound of nickel and silicon is preferable.

As the carbonaceous materials, there are coke, pyrolytic carbon, natural graphite, artificial graphite, mesocarbon microbeads, graphite mesophase particles, gas phase grown carbon, vitrified carbons, carbon fiber (polyacrylonitrile type, pitch type, cellulose type and gas phase grown carbon), amorphous carbon and carbons obtained by baking organic materials. These materials can be used alone or in any combination thereof within the scope that does not impair the effect of the present invention. Among them, graphite materials such as graphite mesophase particles, natural graphite, and artificial graphite are preferable.

It is to be noted that the carbonaceous material may contain, in addition to carbon, such dissimilar compounds as O, B, P, N, S, SiC and $B_4C$. The content of such material is preferably from 0 to 10% by weight.

As the inorganic compounds, there are tin compounds and silicon compounds for example, and as the inorganic oxides, there are titanium oxide, tungsten oxide, molybdenum oxide, niobium oxide, vanadium oxide and iron oxide for example.

As the inorganic chalcogenides, there are, for example, iron sulfide, molybdenum sulfide and titanium sulfide.

As the organic polymer compounds, there are, for example, polymer compounds such as polythiophene and polyacetylene. And as the nitride, there are, for example, cobalt nitride, copper nitride, nickel nitride, iron nitride and manganese nitride.

These negative electrode materials may be used in combination; for example, a combination of carbon and an alloy and a combination of carbon and an inorganic compound are possible.

The average particle size of the carbon material used in the present invention is preferably from 0.1 to 60 μm, and more preferably from 0.5 to 30 μm. The specific surface is preferably from 1 to 10 $m^2/g$. In terms of the crystal structure, graphite having a hexagonal lattice spacing ($d_{002}$) of carbon is from 3.35 to 3.40 Å and a size (LC) of the crystalline in the c-axis direction of 100 Å or larger, is preferable.

In the present invention, since the positive electrode active material comprises Li, a negative electrode material (carbon or the like) that does not comprise Li can be used. However, it is preferable to add a small amount of Li (about 0.01 to 10 parts by weight per 100 parts by weight of the negative electrode material) into such a negative electrode material with no Li, because if part of Li atoms becomes inactive by reacting with the electrolyte, for example, it can be supplemented with the Li added in the negative electrode material.

To add Li into the negative electrode material as thus described, Li is impregnated into the negative electrode material by applying a heated and melted lithium metal onto the current collector to which the negative electrode material is pressed and adhered, or Li is electrochemically doped into the negative electrode material by attaching a lithium metal in advance into an electrode group by pressing and adhering or other means and immersing the whole into an electrolyte solution.

The electrically conductive material used in the negative electrode material mixture is not limited to a particular material but, as in the case of the electrically conductive material used in the positive electrode material mixture, any electronically conductive material can be used as long as the material does not cause any chemical change in the fabricated battery. If the carbonaceous material is used for the negative electrode, the electrically conductive material need not necessarily be added because the carbonaceous material itself has electronic conductivity.

For the binder used in the negative electrode material mixture, either a thermoplastic resin or a thermosetting resin can be used, but a polymer having a decomposition temperature of 300° C. or higher is preferable.

Examples for the binding agent include polyethylene, polypropylene, polytetrafluoroethylene (PTFE), polyvinylidene fluoride (PVDF), styrene-butadiene rubber, tetrafluoroethylene-hexafluoropropylene copolymer (FEP), tetrafluoroethylene-perfluoroalkyl vinyl ether copolymer (PFA), vinylidene fluoride-hexafluoropropylene copolymer, vinylidene fluoride-chlorotrifluoroethylene copolymer, ethylene-tetrafluoroethylene copolymer (ETFE resin), polychlorotrifluoroethylene (PCTFE), vinylidene fluoride-pentafluoropropylene copolymer, propylene-tetrafluoroethylene copolymer, ethylene-chlorotrifluoroethylene copolymer (ECTFE), vinylidene fluoride-hexafluoropropylene-tetrafluoroethylene copolymer and vinylidene fluoride-perfluoromethyl vinyl ether-tetrafluoroethylene copolymer. Among them, styrene-butadiene rubber and polyvinylidene fluoride are preferably used, and styrene-butadiene rubber is most preferably used.

The material of the current collector for the negative electrode is not limited to a particular material, but any electronically conductive material can be used as long as the material does not cause any chemical change in the fabricated battery. As the material constituting the current collector, there are, for example, stainless steel, nickel, copper, titanium, carbon, a material such as copper or stainless steel with the surface treated with carbon, nickel, titanium or silver, or an Al—Cd alloy. Among them, copper or a copper alloy is preferable. The surface of these materials may be treated with oxidization. Also, the surface of the collector may be roughened to form convex and concave by surface treatment.

As for the current collector shape, a foil, a film, a sheet, a net, a punched sheet, a lath body, a porous body, a foamed body, or fiber molding can be used, as in the case for the above positive electrode. The thickness is not particularly specified, but the thickness between 1 μm and 500 μm is preferable.

In addition to the electrically conductive material and the binder, a filler, a dispersing agent, an ion conducting material, a pressure reinforcing agent, and other various additives may be added in the electrode material mixture. Any fibrous material can be used for the filler as long as it does not cause any chemical change in the fabricated battery. Usually, a fiber comprising an olefin polymer fiber such as polypropylene or polyethylene, a glass fiber or a carbon fiber is used. The amount of the filler to be added is not particularly specified, but from 0 to 30% by weight is preferable.

The positive electrode and negative electrode used in the present invention may each have, in addition to the mixture layer containing the positive electrode active material or negative electrode material, other layers such as a base coat layer intended, for example, to improve the adhesion between the collector and the mixture layer, the electrical conductivity, the cycle characteristics, and the charge/discharge efficiency, and a protective layer intended for mechanical and chemical protection of the mixture layer. The base coat layer and the protective layer may contain a binder or electrically conductive agent particles or electrically non-conductive particles.

An insulating microporous thin film having a large ion permeability and a specified mechanical strength may be used as the separator. Preferably, the film has the function of closing the pores and increasing the resistance at a temperature of 80° C. or higher. A sheet or non-woven fabric made of an olefin polymer such as polypropylene or polyethylene alone or in combination thereof, or made of glass fiber is used because of the resistances thereof to an organic solvent and hydrophobicity.

It is desirable that the pore diameter of the separator be made small enough to prevent the active material, the binder, the conductive material and the like separated from the electrode sheet from passing through the separator; for example, a diameter of from 0.1 to 1 μm is desirable. As for the separator thickness, a thickness of from 10 to 300 μm is usually preferable. Porosity is determined in accordance with the electron or ion permeability, the material used, the film thickness and the like, and generally a porosity of from 30 to 80% is desirable. Further, when a flame retardant or nonflammable material such as glass or metal oxide film is used, the safety of the battery is further enhanced.

The non-aqueous electrolyte used in the present invention comprises a solvent and a lithium salt dissolved in the solvent. The preferable solvent is one ester or an ester mixture. Above all, cyclic carbonates, cyclic carboxylic acid esters, non-cyclic carbonates, aliphatic carboxylic acid esters and the like are preferably exemplified. Further, solvent mixtures of cyclic carbonates and non-cyclic carbonates, solvent mixtures of cyclic carboxylic acid esters, and solvent mixtures of cyclic carboxylic acid esters and cyclic carbonates are preferably exemplified.

Other solvents to be used in concrete examples of the aforesaid solvents and in the present invention will be exemplified as follows:

Esters, which may be used as the non-aqueous solvent include, for example, cyclic carbonates such as ethylene carbonate (EC), propylene carbonate (PC), butylene carbonate (BC) and vinylene carbonate (VC), non-cyclic carbonates such as dimethyl carbonate (DMC), diethyl carbonate (DEC), ethyl methyl carbonate (EMC), and dipropyl carbonate (DPC), aliphatic carboxylic acid esters such as methyl formate (MF), methyl acetate (MA), methyl propionate (MP) and ethyl propionate (MA), and cyclic carboxylic acid esters such as γ-butyrolactone (GBL).

For cyclic carbonates, EC, PC, VC and the like are particularly preferable; for cyclic carboxylic acid esters, GBL and the like are particularly preferable; and for non-cyclic carbonates, DMC, DEC, EMC and the like are preferable. Further, aliphatic carboxylic acid esters may also be preferably used, if occasion demands. Preferably, the aliphatic carboxylic acid ester is contained in an amount of 30% or less, and more preferably 20% or less, of the total weight of the solvent.

The solvent in the electrolyte solution of the present invention may contain known aprotic organic solvents, in addition to the above esters in an amount of 80% or more.

Lithium salts dissolved in these solvents include, for example, $LiClO_4$, $LiBF_4$, $LiPF_6$, $LiAlCl_4$, $LiSbF_6$, $LiSCN$, $LiCF_3SO_3$, $LiCF_3CO_2$, $Li(CF_3SO_2)_2$, $LiAsF_6$, $LiN(CF_3SO_2)_2$, $LiB_{10}Cl_{10}$, lithium lower aliphatic carboxylate, chloroborane lithium, lithium tetraphenyl borate, and imides such as $LiN(CF_3SO_2)(C_2F_5SO_2)$, $LiN(CF_3SO_2)_2$, $LiN(C_2F_5SO_2)_2$ and $LiN(CF_3SO_2)(C_4F_9SO_2)$. These salts can be used in the electrolyte alone or in any combination thereof within the scope that does not impair the effect of the present invention. Among them, it is particularly preferable to add $LiPF_6$.

For the non-aqueous electrolyte used in the present invention, an electrolyte containing at least ethylene carbonate and methyl carbonate, and containing $LiPF_6$ as a lithium salt, is particularly preferable. An electrolyte containing GBL as the main solvent is preferred, and in this case, it is preferable to add an additive such as VC in an amount of several %, and to use a salt mixture of $LiBF_4$ and $LiN(C_2F_5SO_2)_2$ as the lithium salt instead of $LiPF_6$.

The amount of the electrolyte used in the battery is not particularly specified, but a suitable amount should be used according to the amount of the positive electrode active material and negative electrode material and the size of the battery. The amount of the lithium salt to be dissolved in the non-aqueous solvent is not particularly specified, but from 0.2 to 2 mol/l is preferable, and from 0.5 to 1.5 mol/l is more preferable.

In use, the electrolyte is normally impregnated or filled into the separator comprising, for example, a porous polymer, glass filter, or non-woven fabric.

To make the electrolyte nonflammable, a halogen-containing solvent such as carbon tetrachloride or chlorotrifluoroethylene may be contained in the electrolyte. Also, carbon dioxide gas may be added in the electrolyte to confer suitability for high temperature storage.

Instead of the liquid electrolyte, a solid electrolyte as described below can also be used. The solid electrolyte is classified to inorganic or organic solid electrolyte.

As the inorganic solid electrolyte, nitrides of Li, halides of Li, and oxysalt of Li are well known. Among them, $Li_4SiO_4$, $Li_4SiO_4$—LiI—LiOH, $xLi_3PO_4$-$(1-x)Li_4SiO_4$, $Li_2SiS_3$, $Li_3PO_4$—$Li_2S$—$SiS_2$ and phosphorus sulfide compounds are effectively used.

As the organic solid electrolyte, on the other hand, there are polymer materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof are effectively used.

It is also possible to use a gel electrolyte formed by impregnating the above non-aqueous liquid electrolyte into the organic solid electrolyte. For the organic solid electrolyte here, polymer matrix materials such as polyethylene oxide, polypropylene oxide, polyphosphazone, polyaziridine, polyethylene sulfide, polyvinyl alcohol, polyvinylidene fluoride, polyhexafluoropropylene, and the derivatives, the mixtures and the complexes thereof, are effectively used. In particular, a copolymer of vinylidene fluoride and hexafluoropropylene and a mixture of polyvinylidene fluoride and polyethylene oxide are preferable.

As for the shape of the battery, any type such as coin type, button type, sheet type, cylindrical type, flat type and rectangular type can be used. In the case of a coin or button battery, the positive electrode active material mixture and negative electrode active material mixture are compressed into the shape of a pellet for use. The thickness and diameter of the pellet should be determined according to the size of the battery.

In the case of a sheet, cylindrical or rectangular type battery, the positive electrode active material mixture and negative electrode active material mixture are usually applied (for coating) onto the current collector, and dried and compressed for use. A well known applying method can be used such as a reverse roll method, direct roll method, blade method, knife method, extrusion method, curtain method, gravure method, bar method, casting method, dip method, and squeeze method. Among them, the blade method, knife method, and extrusion method are preferable.

The application is conducted preferably at a rate of from 0.1 to 100 m/min. By selecting the appropriate applying method according to the solution properties and drying characteristics of the mixture, an applied layer with good surface condition can be obtained. The application to a current collector can be conducted on one side of the current collector, or on the both sides thereof at the same time. Preferably, the applied layers are formed on both sides of the current collector, and the applied layer on one side may be constructed from a plurality of layers including a mixture layer. The mixture layer contains a binder and an electrically conductive material, in addition to the material responsible for the intercalation and releasing of a lithium ion, like the positive electrode active material or negative electrode material. In addition to the mixture layer, a layer containing no active material such as a protective layer, a under coating layer formed on the current collector, and an intermediate layer formed between the mixture layers may be provided. It is preferable that these active-material non-containing layers contain an electrically conductive particle, an insulating particle and a binder.

The application may be performed continuously or intermittently or in such a manner as to form stripes. The thickness, length, and width of the applied layer is determined according to the size of the battery, but preferably, the thickness of the applied layer on each side, after being dried and compressed, is from 1 to 2000 μm.

For drying or dehydration method of the pellet and sheet as the mixture, a commonly employed method can be used. Preferably, heated air, vacuum, infrared radiation, far infrared radiation, electron beam radiation and low humidity air are used alone or in any combination thereof.

The temperature used is preferably within the range of 80 to 350° C., and more preferably 100 to 250° C. The water content of the battery as a whole is preferably held to 2000 ppm or less, and for the positive electrode material mixture, negative electrode material mixture and electrolyte, it is preferable to hold the water content to 500 ppm or less in view of the cycle characteristics.

For the sheet pressing method, a commonly employed method can be used, but a mold pressing method and calender pressing method are particularly preferable. The pressure for use is not particularly specified, but from 0.2 to 3 t/cm$^2$ is preferable. In the case of the calender pressing method, a press speed is preferably from 0.1 to 50 m/min.

The pressing temperature is preferably between room temperature and 200%. The ratio of the width of the positive electrode sheet to the width of the negative electrode sheet is preferably at 0.9 to 1.1, and more preferably at 0.95 to 1.0. The ratio of the content of the positive electrode active material to the content of the negative electrode material cannot be specified because it differs according to the kind of the compound used and the formulation of the mixture, but those skilled in the art can set an optimum value considering the capacity, cycle characteristics and safety.

The wound electrode structure in the present invention need not necessarily be formed in a true cylindrical shape, but may be formed in the shape of an elliptic cylinder whose cross section is an ellipse or in the shape of a rectangular column having a prismatic shape or a rectangular face, for example.

Figure 9:
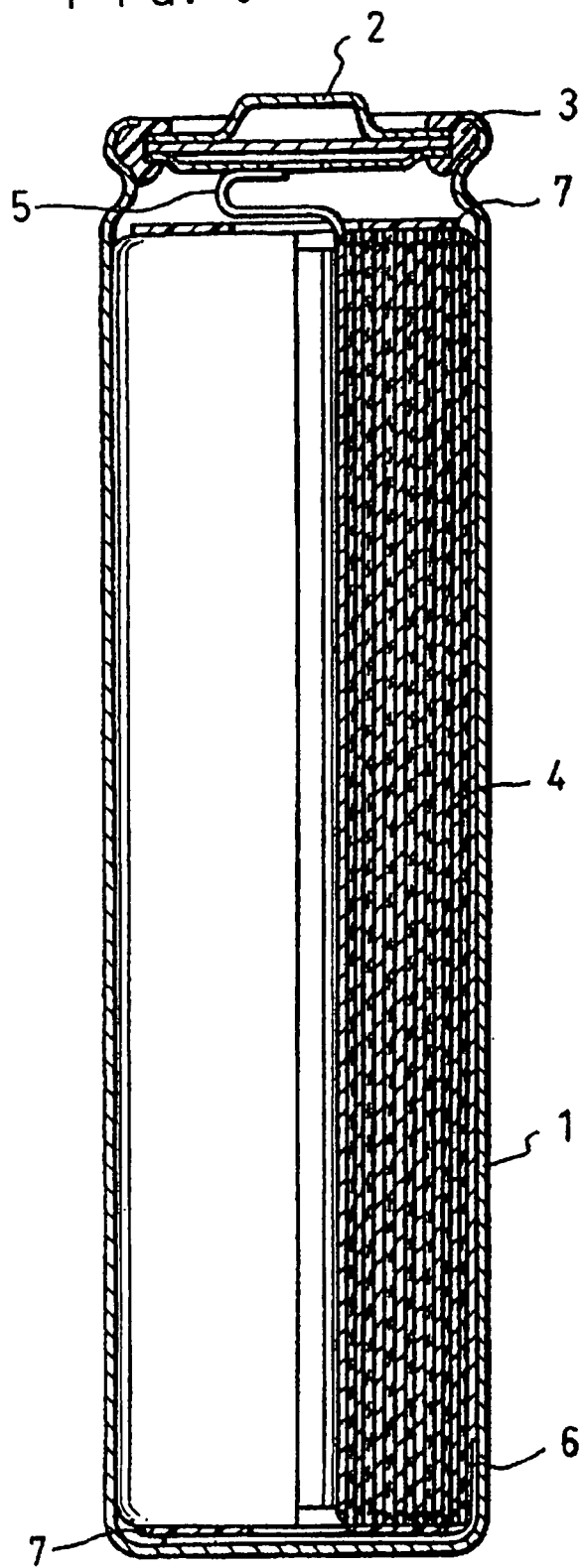
FIG. 9 is a partially schematic vertical cross sectional view of a cylindrical battery produced in Examples of the present invention.

FIG. 9 is a partially schematic vertical cross sectional view representing a cylindrical battery.

An electrode plate group 4, formed by spirally winding a positive electrode plate and a negative electrode plate a plurality of times with a separator interposed therebetween, is accommodated in a battery case 1. A positive electrode lead 5 is brought out of the positive electrode plate and connected to a sealing plate 2, and a negative electrode lead 6 is brought out of the negative electrode plate and connected to the bottom of the battery case 1. A metal or alloy having electronic conductivity and resistance to organic electrolyte can be used for the battery case and the lead plates. Examples include such metals as iron, nickel, titanium, chromium, molybdenum, copper, aluminum and the alloys thereof. Among them, a stainless steel plate or an Al—Mn alloy plate is preferable for the battery case, while aluminum and nickel are most preferable for the positive electrode lead and the negative electrode lead, respectively. Alternatively, various kinds of engineering plastics and metals combined with such plastics may be used for the battery case so as to reduce the battery weight.

The top and bottom of the electrode plate group 4 are each provided with an insulating ring 7. In this condition, an electrolyte is charged, and the battery case is hermetically sealed with the sealing plate. At this time, a safety valve may be attached to the sealing plate. Instead of the safety valve, various other conventionally-known safety devices may also be used. For example, a fuse, a bimetal, a PTC device or the like can be used as an overcurrent protection device. Rather than attaching a safety valve, other methods, such as cutting a nick into the battery case, cracking the gasket 3 or the sealing plate, or cutting off the lead plate, may be employed for protecting internal pressure rise of the battery case. Also, a protection circuit having an overcharge or overdischarge inhibiting function may be incorporated into a charger, or such a circuit may be connected separately.

Alternatively, a method that cuts off the current when the battery internal pressure rises can be employed as an overcharge protection measure. In this case, a compound that may raise the internal pressure can be added into the mixture or in the electrolyte. Such compounds include carbonates such as $Li_2CO_3$, $LiHCO_3$, $Na_2CO_3$, $NaHCO_3$, $CaCO_3$ and $MgCO_3$, for example. Known methods (e.g., DC or AC electric welding, laser welding, ultrasonic welding or the like) can be used for welding the cap, battery case, sheets, and lead plates. For the sealing agent used for sealing, a conventionally-known compound or mixture such as asphalt can be used.

The present invention will now be described with reference to representative examples, but it will be recognized that the invention is not limited to the particular examples given hereinafter.

EXAMPLE 1 AND COMPARATIVE EXAMPLES 1 TO 4

The cylindrical battery shown in FIG. 9 was produced here.

A positive electrode plate was produced as follows: 10 parts by weight of carbon powder as the electrically conductive material and 5 parts by weight of polyvinylidene fluoride resin as the binder were mixed together with 85 parts by weight of powder of the positive electrode active material of the present invention. The resulting mixture was then dispersed into dehydrated N-methylpyrrolidinone to obtain a slurry, which was then applied on the positive electrode current collector formed from an aluminum foil and, after drying and roll-pressing, the foil was cut to the specified size to obtain the positive electrode plate.

A carbonaceous material and a styrene-butadiene rubber type binder were mixed in a weight ratio of 100:5, and the resulting mixture was applied on both surfaces of a copper foil and, after drying and roll-pressing, the foil was cut to the specified size to obtain the negative electrode plate.

A microporous polyethylene film was used as the separator. An organic electrolyte was prepared by dissolving 1.5 mol/l of $LiPF_6$ into a solvent mixture of polyethylene carbonate and ethyl methyl carbonate in a volumetric ratio of 1:1. The fabricated cylindrical battery was 18 mm in diameter and 650 mm in height.

As the positive electrode active material, $Li[Li_{0.03}(Ni_{1/2}Mn_{1/2})_{0.97}]O_2$ was used (Example 1). This positive electrode active material was analyzed by XANES to confirm that nickel is bivalent and manganese is tetravalent as mentioned above.

A cylindrical battery was fabricated using the above positive electrode active material, and then put through the repetition of charging and discharging, and disassembled. The positive electrode active material taken out from the battery was also analyzed by XANES to measure the valence of elements. As a result, when the voltage relative to lithium metal was 2.5 to 3.5 V, the valences of nickel and manganese determined from the calibration curve obtained from the absorption maximum in the X-ray absorption near-K-edge structures of nickel and manganese were bivalent and tetravalent respectively.

For comparison, a mixture in the same composition ratio as Example 1 was prepared using powders of lithium hydroxide, nickel hydroxide and manganese oxyhydroxide. All the processes after the baking were the same as those in Example 1. Then, a cylindrical battery was fabricated using the material as thus obtained (Comparative Example 1). The material was analyzed by XANES to find that the valences of nickel and manganese are not bivalent and tetravalent respectively.

For further comparison, a cylindrical battery was fabricated in the same way using $LiCO_2$ as the positive electrode active material (Comparative Example 2). Additionally, for more further comparison, a cylindrical battery was produced using $LiNi_{1/2}Co_{1/2}O_2$ prepared by the coprecipitation synthesis method disclosed in Japanese Laid-Open Patent Publication No. 2002-42813 (Comparative Example 3). The positive electrode active material was baked at a temperature of 900° C. Moreover, spinel lithium manganese oxide was used to fabricate the same cylindrical battery as above for a comparative example (Comparative Example 4). Electrolytic manganese dioxide and lithium carbonate were mixed in a predetermined composition ratio, and the resulting mixture was baked at 850° C. to obtain $LiMn_2O_4$. The battery capacity varied according to the active materials with various capacities.

These batteries were, at first, charged at a constant current of 100 mA up to 4.2 V, and then were discharged at a constant current of 100 mA down to 2.0 V. This charge/discharge cycle was repeated several times; thereafter, capacity was checked when the battery capacity became stable.

The capacity check was conducted under the following conditions. The charge was performed at a constant voltage of 4.2 V and the maximum current was 1 A. The charge was stopped when the current value reached 50 mA. The discharge was performed at a constant current of 300 mA down to 2.5 V. The discharge capacity obtained at that time was referred to as the battery discharge capacity. The charge and discharge were performed in an atmosphere of 25° C. This charge/discharge cycle was carried out up to 500 cycles. Table 1 shows the capacities after 500 cycles, which are indicated in an index where the capacity checked before the cycle life test (i.e. capacity immediately after the production of battery) is taken as 100 since the batteries of Example 1, Comparative Examples 1 and 2 have different capacities. Accordingly, the values show the cycle degradation ratio and the greater the value is, the more excellent the cycle life is. The same test was also performed in an atmosphere of 45° C. The results are shown in Table 1.

TABLE 1

|  |  | Composition | 20° C. cycles | 40° C. cycles |
|---|---|---|---|---|
| Ex. | 1 | $Li[Li_{0.03}(Ni_{1/2}Mn_{1/2})_{0.97}]O_2$ bivalent Ni and tetravalent Mn confirmed | 84 | 81 |
| Comp. Ex. | 1 | $Li[Li_{0.03}(Ni_{1/2}Mn_{1/2})_{0.97}]O_2$ bivalent Ni and tetravalent Mn not confirmed | 67 | 61 |
|  | 2 | $LiCoO_2$ | 70 | 62 |
|  | 3 | $LiNi_{1/2}Co_{1/2}O_2$ bivalent Ni not confirmed | 70 | 63 |
|  | 4 | $LiMn_2O_4$ | 71 | 50 |

It is apparent from the results of Table 1 that the battery using the positive electrode active material of the present invention excels in cycle life. Accordingly, the application of the positive electrode active material to a lithium secondary battery provides a more excellent battery than conventional batteries using $LiCoO_2$.

EXAMPLE 2

Stability of the Material

When Li leaves $LiNiO_2$ due to charging, $LiNiO_2$ becomes extremely unstable and releases oxygen at a relatively low temperature to form NiO. This is fatal when used as the positive electrode active material of the battery because a thermal runaway of the battery may occur due to the generated oxygen, which leads to ignition or bursting of the battery.

The disadvantage like this was able to be overcome using the oxide containing nickel and manganese at a ratio of 1:1 and the oxide containing nickel, manganese and cobalt at a ratio of 1:1:1. The heat resistance was also able to be improved by doping aluminum into the vicinity of the surface of the positive electrode active material.

A cylindrical battery was produced in the same manner as Example 1 using $Li[Li_{0.03}(Ni_{1/2}Mn_{1/2})_{0.97}]O_2$ doped with aluminum as the positive electrode active material, and was put through the following test. The amount of aluminum was 5 atom % to the total amount of nickel and manganese. The battery was overcharged to 4.8 V, and then disassembled; thereafter, the positive electrode material mixture was taken out from the battery. The positive electrode material mixture was subjected to DSC (Differential Scanning Calorimetry) measurement. FIG. 2 shows the exothermic peak appeared at the lowest temperature obtained from the DSC measurement. The batteries of Example 1 and Comparative Example 2 were also subjected to the same measurement.

TABLE 2

| | Composition | Peak of DSC measurement |
|---|---|---|
| Ex. 1 | $Li[Li_{0.03}(Ni_{1/2}Mn_{1/2})_{0.97}]O_2$ | 203 |
| Ex. 2 | $Li[Li_{0.03}(Ni_{1/2}Mn_{1/2})_{0.97}]O_2$ added with 5 atom % of aluminum | 210 |
| Comp. Ex. 2 | $LiCoO_2$ | 118 |

It is apparent from Table 2 that the exothermic temperature in any of Examples increased as compared to that in Comparative Example. The mechanisms thereof can be considered as follows. When $LiCoO_2$ is used, the whole lattice of $LiCoO_2$ expands due to overcharging. This makes the crystal structure unstable and oxygen is easily released. When the temperature is increased in this condition, an exothermic reaction presumably due to the released oxygen is observed. On the other hand, in the positive electrode active material in Example 1 of the present invention, it is conceivable that the oxidation-reduction reaction of the organic matter (electrolyte) being present on the surface of the crystal particles and the oxygen release due to the lattice were suppressed.

It is further evident that when aluminum is added, this effect enhances, specifically, the exothermic peak temperature is greatly increased and thermal stability of the positive electrode active material is significantly improved. As for the amount of aluminum to be added, a preferable result was obtained within the range of 0.05 to 20 atom % to the total amount of the transition metals. When the added amount was less than 0.05 atom %, a sufficient effect was not able to be obtained; when it was more than 20 atom %, the capacity decreased. It should be noted that aluminum presumably has a valence of 3+.

EXAMPLES 3 TO 5 AND COMPARATIVE EXAMPLES 3 TO 4

Electronic Conductivity of the Positive Electrode Active Material

Doping a different kind of element into $Li[Li_{0.03}(Ni_{1/2}Mn_{1/2})_{0.97}]O_2$ of the present invention can represent an added function; when magnesium is added, electronic conductivity is significantly improved. This makes it possible to decrease the amount of the electrically conductive material to be added into the positive electrode plate so as to increase the battery capacity, that is, more active material can be added.

In this example, 3 parts by weight of carbon powder as the electrically conductive material and 4 parts by weight of polyvinylidene fluoride resin as the binder were mixed together with 93 parts by weight of powder of the positive electrode active material. The electronic conductivity of the electrode plate using the resultant mixture was measured. The measurement was conducted as follows. The resistance value in the thickness direction of the electrode plate was measured and converted to an electronic conductivity per unit area. Table 3 shows the results indicated in an index where the electronic conductivity of the electrode plate using $Li[Li_{0.03}(Ni_{1/2}Mn_{1/2})_{0.97}]O_2$ is taken as 100.

The electrode plates containing the positive electrode active material added with magnesium and different amounts of the electrically conductive material were also subjected to the electronic conductivity measurement. The positive electrode active material was obtained by baking the compound containing nickel, manganese and lithium prepared by mechanical alloying process, to which an appropriate amount of magnesium hydroxide was added at the same time. The amount of magnesium to be added was 2 atom %.

The weight ratio of the positive electrode active material powder, electrically conductive material and polyvinylidene fluoride resin was 93:3:4 (Example 3), 93:3:4 (Example 4), 94:2:4 (Example 5), 95:1:4 (Example 6), 95:1:4 (Comparative Example 3) or 93:3:4 (Comparative Example 4).

TABLE 3

| | | Composition | Amount of electrically conductive material to be added (wt %) | Electronic conductivity |
|---|---|---|---|---|
| Ex. | 3 | $Li[Li_{0.03}(Ni_{1/2}Mn_{1/2})_{0.97}]O_2$ bivalent Ni and tetravalent Mn observed | 3 | 100 |
| | 4 | $Li[Li_{0.03}(Ni_{1/2}Mn_{1/2})_{0.97}]O_2$ added with 2 atom % of Mg bivalent Ni and tetravalent Mn observed | 1 | 98 |
| | 5 | | 2 | 100 |
| | 6 | | 3 | 103 |
| Comp. Ex. 3 | | $LiCoO_2$ | 1 | 84 |
| Comp. Ex. 4 | | $LiCoO_2$ | 3 | 98 |

It is apparent from Table 3 that when magnesium is doped, the electrode plate added with 2% by weight of the electrically conductive material exhibits the same electronic conductivity as the one added with 3% by weight of the electrically conductive material which has conventionally been used. Although it shows a similar tendency to the case where aluminum was added, the added amount is preferably 0.05 to 10 atom % because magnesium which is not doped to the positive electrode active material is detected as an impurity as the added amount is increased.

EXAMPLE 7 TO 8 AND COMPARATIVE EXAMPLE 5

Reduction of Polarization

Doping a different kind of element into $Li[Li_{0.03}(Ni_{1/2}Mn_{1/2})_{0.97}]O_2$ of the present invention can represent an added function; when cobalt is added, the polarization of the positive electrode can be reduced. This makes it possible to reduce the irreversible capacity of the positive electrode at a room temperature and to enhance the capacity during high rate discharging.

In this example, 10 parts by weight of carbon powder as the electrically conductive material and 5 parts by weight of polyvinylidene fluoride resin as the binder were mixed together with 85 parts by weight of powder of the positive electrode active material. The same cylindrical battery as that of Example 1 was fabricated and the polarization characteristics were evaluated. Table 4 shows the results indicated in an index where the capacity ratio of discharge at a ½ hour rate (2 C discharge) to that at a 5 hour rate (0.2 C discharge) of the electrode plate using $Li[Li_{0.03}(Ni_{1/2}Mn_{1/2})_{0.97}]O_2$ is taken as 100.

The positive electrode active material was obtained by baking the compound containing nickel, manganese and lithium prepared by mechanical alloying process, to which an appropriate amount of cobalt hydroxide was added at the same time. The amount of cobalt to be added was 10 atom % (Example 7). It was found that even when cobalt is uniformly doped into the particles including the inside thereof, the effect of controlling the valences of nickel and manganese reduction can be exhibited. The positive electrode active material used here comprises a composite oxide containing nickel, manganese and lithium prepared by mechanical alloying process. The composition ratio of nickel, manganese and cobalt was 1:1:1. The obtained compound was baked to give a positive electrode active material (Example 8). For comparison, the same battery was fabricated using $LiCoO_2$ (Comparative Example 5).

TABLE 4

|  |  | Composition | Polarization characteristics |
|---|---|---|---|
| Ex. | 1 | $Li[Li_{0.03}(Ni_{1/2}Mn_{1/2})_{0.97}]O_2$ bivalent Ni and tetravalent Mn observed | 100 |
|  | 7 | $Li[Li_{0.03}(Ni_{1/2}Mn_{1/2})_{0.97}]O_2$ added with 10 atom % of cobalt bivalent Ni and tetravalent Mn observed | 104 |
|  | 8 | $Li[Li_{0.03}(Ni_{1/3}Mn_{1/3}Co_{1/3})_{0.97}]O_2$ | 105 |
| Comp. Ex. 3 |  | $LiCoO_2$ | 85 |

It is apparent from Table 4 that the polarization characteristics are improved when cobalt is doped. It is further found, from the result of Example 5, that this effect is not inhibited even when cobalt is uniformly doped into the particles including the inside thereof and that the effect of polarization reduction due to cobalt can be obtained. Unlike aluminum and magnesium, even when the amount of cobalt to be added was increased, the polarization characteristics were improved while the valences of nickel and manganese were controlled; the preferable amount was 0.05 to 50 atom %.

According to the present invention, an inexpensive nickel manganese composite oxide can be used as the positive electrode active material and a high-capacity non-aqueous electrolyte secondary battery with excellent charge/discharge efficiency can be provided.

Although the present invention has been described in terms of the presently preferred embodiments, it is to be understood that such disclosure is not to be interpreted as limiting. Various alterations and modifications will no doubt become apparent to those skilled in the art to which the present invention pertains, after having read the above disclosure. Accordingly, it is intended that the appended claims be interpreted as covering all alterations and modifications as fall within the true spirit and scope of the invention.

The invention claimed is:

1. A positive electrode active material comprising a lithium-containing composite oxide containing nickel with an oxidation state of 2.0 to 2.5 and manganese with an oxidation state of 3.5 to 4.0, said oxidation state determined by the shifts of energy at which absorption maximum is observed in the X-ray absorption near-K-edge structures, wherein said lithium-containing composite oxide contains cobalt and the cobalt, nickel, and manganese are uniformly dispersed in the nano level forming a solid solution.

2. The positive electrode active material in accordance with claim 1, wherein said composite oxide comprises primary particles and secondary particles, wherein said secondary particles are a sintered body of said primary particles.

* * * * *